(12) United States Patent
Schmitz et al.

(10) Patent No.: US 9,820,119 B2
(45) Date of Patent: Nov. 14, 2017

(54) METHOD AND SYSTEMS FOR LOCKBOX SECURED FILE TRANSMISSION

(71) Applicant: SWN Communications, Inc., New York, NY (US)

(72) Inventors: Anthony Schmitz, Clifton, NJ (US); Alexandros Tsepetis, Wenham, MA (US)

(73) Assignee: SWN Communications, Inc.

( * ) Notice: Subject to any disclaimer, the term of this patent is extended or adjusted under 35 U.S.C. 154(b) by 423 days.

(21) Appl. No.: 14/305,181

(22) Filed: Jun. 16, 2014

(65) Prior Publication Data

US 2015/0101060 A1 Apr. 9, 2015

Related U.S. Application Data

(60) Provisional application No. 61/888,565, filed on Oct. 9, 2013, provisional application No. 61/888,569, filed on Oct. 9, 2013.

(51) Int. Cl.
| | |
|---|---|
| H04L 29/06 | (2006.01) |
| H04W 4/22 | (2009.01) |
| H04W 64/00 | (2009.01) |
| H04W 4/12 | (2009.01) |
| H04L 12/58 | (2006.01) |
| G06F 17/30 | (2006.01) |
| H04L 12/18 | (2006.01) |

(52) U.S. Cl.
CPC .......... *H04W 4/22* (2013.01); *G06F 17/3023* (2013.01); *H04L 51/043* (2013.01); *H04L 51/24* (2013.01); *H04L 63/04* (2013.01); *H04W 4/12* (2013.01); *H04W 64/00* (2013.01); *H04L 12/1895* (2013.01)

(58) Field of Classification Search
CPC ......... H04W 4/22; H04W 64/00; H04W 4/12; G06F 17/3023; H04L 51/043; H04L 51/24; H04L 63/04
See application file for complete search history.

(56) References Cited

U.S. PATENT DOCUMENTS 5,801,700 A * 9/1998 Ferguson .............. G06F 3/0486
715/748
6,301,567 B1 * 10/2001 Leong .................. G06Q 20/042
705/18

(Continued)

*Primary Examiner* — Hadi Armouche
*Assistant Examiner* — Sher A Khan
(74) *Attorney, Agent, or Firm* — Jennifer Meredith, Esq.; Meredith & Keyhani, PLLC

(57) ABSTRACT

A transparent method, and systems, for secure file transmission from a first computing device of a sender to a recipient computing device, comprising the steps of: selecting a group, at least one recipient having a recipient computing device and a file from the first computing device; selecting a lockbox option at the first computing device to securely transmit the file to a lockbox situated at the at least one recipient computing device; iteratively selecting a location on at least one recipient computing device where the file is to be dispatched by performing a set of lockbox content version control operations at the first computing device until a valid location on the at least one recipient computing device is selected; dispatching the file at the valid location and presenting an indication that the file is dispatched with the lockbox option; and displaying the file.

20 Claims, 22 Drawing Sheets

(56) References Cited

U.S. PATENT DOCUMENTS

| | | | |
|---|---|---|---|
| 6,711,608 B1 | 3/2004 | Ogilvie | |
| 7,224,373 B1* | 5/2007 | Duarte | G06F 1/162 |
| | | | 345/168 |
| 7,729,684 B1 | 6/2010 | Straub | |
| 8,176,562 B1* | 5/2012 | Hernacki | G06F 17/30082 |
| | | | 709/223 |
| 8,320,875 B2 | 11/2012 | Musgrove | |
| 2002/0107930 A1* | 8/2002 | Itoh | H04L 51/28 |
| | | | 709/206 |
| 2003/0105716 A1* | 6/2003 | Sutton, Jr. | H04L 9/3247 |
| | | | 705/50 |
| 2003/0105812 A1* | 6/2003 | Flowers, Jr. | H04L 63/029 |
| | | | 709/203 |
| 2004/0148359 A1* | 7/2004 | Ahmed | G06Q 10/107 |
| | | | 709/207 |
| 2004/0205168 A1* | 10/2004 | Asher | H04L 29/06 |
| | | | 709/220 |
| 2004/0267707 A1* | 12/2004 | Hayes-Roth | G06F 21/6218 |
| 2005/0044159 A1 | 2/2005 | Niemi | |
| 2005/0091289 A1* | 4/2005 | Shappell | G06F 17/30067 |
| 2005/0181775 A1* | 8/2005 | Rideout, Jr. | G06Q 10/109 |
| | | | 455/414.3 |
| 2005/0216473 A1* | 9/2005 | Aoyagi | G06F 17/30206 |
| 2005/0216827 A1* | 9/2005 | Mochizuki | G06Q 10/107 |
| | | | 715/229 |
| 2005/0256909 A1* | 11/2005 | Aboulhosn | G06F 17/30206 |
| 2006/0224748 A1* | 10/2006 | Gupta | H04L 12/1854 |
| | | | 709/228 |
| 2007/0136370 A1* | 6/2007 | Frieder | G06F 17/30206 |
| 2007/0168519 A1* | 7/2007 | Hayutin | G06Q 10/107 |
| | | | 709/227 |
| 2007/0282743 A1* | 12/2007 | Lovelett | G06Q 20/10 |
| | | | 705/40 |
| 2007/0288280 A1* | 12/2007 | Gilbert | G06F 21/554 |
| | | | 705/80 |
| 2008/0005195 A1* | 1/2008 | Li | G06F 17/30174 |
| 2008/0007770 A1* | 1/2008 | Tokunaga | G06Q 10/00 |
| | | | 358/1.15 |
| 2008/0140732 A1* | 6/2008 | Wilson | G06F 17/3023 |
| 2009/0182833 A1* | 7/2009 | Balasubramanian | G06Q 10/107 |
| | | | 709/208 |
| 2010/0003949 A1* | 1/2010 | Ray | G10L 13/043 |
| | | | 455/404.1 |
| 2010/0161752 A1* | 6/2010 | Collet | H04L 67/104 |
| | | | 709/216 |
| 2012/0054156 A1* | 3/2012 | Mason, Jr. | G06F 11/1448 |
| | | | 707/679 |
| 2012/0089569 A1* | 4/2012 | Mason, Jr. | G06F 17/3023 |
| | | | 707/639 |
| 2013/0173530 A1* | 7/2013 | Laron | G06F 17/30165 |
| | | | 707/608 |
| 2014/0351346 A1* | 11/2014 | Barton | H04L 51/00 |
| | | | 709/206 |
| 2015/0081630 A1* | 3/2015 | Linsalata | G06F 17/30578 |
| | | | 707/617 |
| 2015/0081635 A1* | 3/2015 | Maze | G06F 17/30203 |
| | | | 707/638 |
| 2015/0120842 A1* | 4/2015 | Huggins | H04L 51/08 |
| | | | 709/206 |

* cited by examiner

Fig. 5

Send Message — 500

Message Summary
☐ 1 out of 2 Groups Selected
☐ 3 out of 3 Recipients Selected
☐ Show Recipients Counts per Language
☐ Show SWN Direct Recipients Online Features
☑ Get Word Back
  ☐ Escalation
☐ Message Templates
☐ IMS
☐ Voice Recording
☐ Configure Intro
☐ SWN Direct
☐ Conference Bridge
☐ PIN Code
☐ Cascade
☐ Message Board Options
☑ Alert Links
☐ Scheduled Alert

— 510

Your Name: Tony Schmitz
Your Phone: 212-379-4900
Your Email: tschmitz@sendwordnow.com  ex.
Custom From: swnalert@sendwordnow.ca ▽
Subject: Send Word Now Alert
Message: This is test 2 for our legal eagles.
This is a test of EM with GWB and Lockbox
How are you feeling today?

893 characters remaining

Specify Devices:  ○ All Devices  ○ Voice Only  ○ Text Only  ● Specify Devices
  ☐ Voice - Express Voice
  ☐ Voice - Phone #1
  ☐ Text - Express Messenger
  ☐ Text - Office Email
Select All | Deselect All | Select Text Only | Select Voice Only Get Word Back
Response 1: Great  [+] [−]
Response 2: Super  [+] [−]
Response 3: Fabulous  [+] [−]
— 520

Alert Links
Alert Links
-File                     Status
feauturesbyaccount.pdf    Completed
— 530                     — 590
— 540
— 550

[Add AlertLink] — 570
[Go Back ▽] — 580   [Cancel]   [Spellcheck]   [Send Message △]
                                — 592       — 560
— 594

Send Message — 600

- Your Name: Tony Schmitz
- Your Phone: 212-379-4900 ex.
- Your Email: tschmitz@sendwordnow.com
- Custom From: swnalert@sendwordnow.ca — 602
- Subject: Send Word Now Alert — 604
- Message: This is a test 2 for our legal eagles. This is a test of EM with GWB and Lockbox. How are you feeling today? — 608
- 893 characters remaining — 616
- Specify Devices: ○ All Devices  ○ Voice Only  ○ Text Only  ● Specify Devices — 622
  - ☐ Voice - Express Voice — 624
  - ☐ Voice - Phone #1 — 626
  - ☐ Text - Express Messenger — 618
  - ☐ Text - Office Email — 628
  - Select All | Deselect All | Select Text Only | Select Voice Only — 620
- 612

Message Summary
- ☐ 1 out of 2 Groups Selected
- ☐ 3 out of 3 Recipients Selected
- ☐ Show Recipients Counts per Language
- ☐ Show SWN Direct Recipients Online

Features
- ☑ Get Word Back
- ☐ Escalation
- ☐ Message Templates
- ☐ IMS
- ☐ Voice Recording
- ☐ Configure Intro
- ☐ SWN Direct
- ☐ Conference Bridge
- ☐ PIN Code
- ☐ Cascade
- ☐ Message Board Options
- ☑ Alert Links
- ☐ Scheduled Alert

Get Word Back
- Response 1: [Great] [+] [-]
- Response 2: [Super] [+] [-]
- Response 3: [Fabulous] [+] [-]

Alert Links

| File | Status |
|---|---|
| feauturesbyaccount.pdf | Completed |

[Add AlertLink]

— 610

[Go Back] [Cancel] [Spellcheck] [Send Message ▲]

Send Message — 700

Message Summary
- ☐ 1 out of 2 Groups Selected
- ☐ 3 out of 3 Recipients Selected
- ☐ Show Recipients Counts per Language
- ☐ Show SWN Direct Recipients Online

Features
- ☑ Get Word Back
  - ☐ Escalation

Message Board Options
- ☐ Message Board Options
- ☑ Alert Links
- ☐ Scheduled Alert Your Name: Tony Schmitz
Your Phone: 212-379-4900  ex.
Your Email: tschmitz@sendwordnow.com
Custom From: swnalert@sendwordnow.ca ▼
Subject: Send Word Now Alert
Message:

Select folder — 710
☐ Root
  ☐ Emergency Response — 720
    ☐ First Responders
  ☐ Demo Folder File name: featuresbyaccount.pdf
Selected Path: \Root\ — 740
[Save] [Cancel] — 730
— 750

Specify Devices: 893  ○A
Select All | Deselect All | Select Text Only | Select Voice Only

Get Word Back
Response 1: Great  [+] [-]
Response 2: Super  [+] [-]
Response 3: Fabulous  [+] [-]

Alert Links

| File | Status |
|---|---|
| feauturesbyaccount.pdf | Completed |

[Add AlertLink]

[▽ Go Back]  [Cancel]  [Spellcheck]  [Send Message △]

Fig. 7

Send Message

Your Name: Tony Schmitz
Your Phone: 212-379-4900
Your Email: tschmitz@sendwordnow.com          ex.
Custom From: swnalert@sendwordnow.ca
Subject: Send Word Now Alert
Message:

Specify Devices: ○ A
893
□ □ □

Select folder

└ □ Root\
  └ □ Emergency Response
  └ □ First Responders
  └ □ Demo Folder

File name:    featuresbyaccount.pdf
Selected Path: \Root\
File already exists in the selected folder. Do you want to overwrite it?

[ Overwrite ]
[ Select another folder ] — 820
[ Cancel ]

Select All | Deselect All | Select Text Only | Select Voice Only
— 830
— 810

Get Word Back
Response 1: Great          [+] [−]
Response 2: Super          [+] [−]
Response 3: Fabulous       [+] [−]

Message Summary
□ 1 out of 2 Groups Selected
□ 3 out of 3 Recipients Selected
□ Show Recipients Counts per Language
□ Show SWN Direct Recipients Online

Features
☑ Get Word Back

□ Message Board Options
☑ Alert Links
□ Scheduled Alert

Alert Links

| Alert Links | | |
|---|---|---|
| File | Status | |
| feauturesbyaccount.pdf | Completed | 🔳 |

[ Add AlertLink ]

[▽] [ Go Back ]   [ Cancel ]   [ Spellcheck ]   [ Send Message ] [△]

Fig. 17 test

Report Title: test
Date: Wednesday, June 04, 2014 4:29 PM
Run By: Schmitz Tony

From: 5/29/2014 4:28:00 PM
To: 5/31/2014 4:28:00 PM

2100

| Group ID | Group Description | Contact ID | Name | Lockbox Path | Lockbox File | Sender Name | Event | Event Date |
|---|---|---|---|---|---|---|---|---|
| swndirect | swn direct test group | tschmitz | Schmitz, Tony | /Root | 3.2_FeaturesbyAccount_102013.pdf | Tony Schmitz | Retrieved | 5/30/2014 8:07:15 AM |
| swndirect | swn direct test group | tschmitz | Schmitz, Tony | /Root/EmergencyResponseFirstResponders | 3.2_FeaturesbyAccount_102013.pdf | Tony Schmitz | Sent | 5/30/2014 8:21:42 AM |
| swndirect | swn direct test group | tschmitz | Schmitz, Tony | /Root/EmergencyResponseFirstResponders | 3.2_FeaturesbyAccount_102013.pdf | Tony Schmitz | Retrieved | 5/30/2014 8:21:51 AM |
| swndirect | swn direct test group | tschmitz | Schmitz, Tony | /Root/EmergencyResponseFirstResponders | 3.2_FeaturesbyAccount_102013.pdf | Tony Schmitz | Viewed | 5/30/2014 8:22:52 AM |

Fig. 21

METHOD AND SYSTEMS FOR LOCKBOX SECURED FILE TRANSMISSION

BACKGROUND

1. Field of Disclosure

The present disclosure generally relates to secure file transmission from a first computing device of a sender to a second computing device of a recipient.

2. Brief Description of Related Art

In the recent years, file sharing applications have been widely used by a large number of domestic users as well as by several commercial franchises. At the domestic end, file sharing applications may typically be used for sharing pictures, schedules, and school assignments with family and friends. On the commercial end, file sharing applications may be used for marketing, advertisement, communicating with employees, partners, customers, suppliers and the like. Sharing files can be challenging through current delivery channels or applications.

Conventional file sharing systems are known for expensive usage fees where charges may apply for each segment when sharing a file. The file dispatch costs may accrue exponentially when a file is to be transmitted to a large number of subscribers dispersed all around the world.

Conventional file sharing systems typically have a limited number of characters and limited length of content. Furthermore, typically file sharing systems may charge enormous storage fees for storing the shared files. As for the contents of the shared files, in the modern world where many operations are performed electronically, sensitive information is often shared over the internet. Conventional file sharing systems do not provide adequate measures to protect the sensitive information. This lack of security controls in the existing file sharing systems renders the users of the system vulnerable to cyber-attacks.

Likewise, a sender of a file using the present file sharing systems is neither guaranteed end-point delivery nor given a return receipt notification. After sending a file, the sender does not have access to diagnostics services for tracking down the transmitted file. The only option the sender may have is to spend hours resolving file delivery issues with the operators. This can be detrimental especially when time sensitive or confidential information is to be transmitted to a large group of customers.

It can therefore be appreciated that it would be desirable to provide a secure two way link between a sender and a recipient to exchange confidential files in a timely manner. In other words, a file may be sent by a sender to a recipient, who may in turn modify the file and send it back to the sender for review and or acceptance. In this scenario the same file may have versions that may not be preserved since files may be overwritten during the course of edits. Thus, conventional file sharing systems do not have a capability to enforce version control. Another challenge presented by the conventional file sharing systems is accessing files when there is no Wi-Fi or cellular data connectivity. Yet another challenge presented by the conventional file sharing systems is lost or stolen devices. If a person loses his/her computing device such as cell phone, tablet or a personal computer, then the person may not be able to access files or the previous versions of the file.

It would therefore be desirable to have a file transmission system that can replace the existing file transmission system, which can transmit messages that are encrypted end to end, can provide return receipt notification and enforce version control. It is also desirable to have a message transmission system that can economically provide unlimited usage, unlimited message size, and simple administration to allow a sender to easily transmit any number of files to any number of recipients regardless of the file size or recipient location. Accordingly, there is a need for a file transmission system that can securely transfer and store files of all types in addition to providing file backup.

BRIEF SUMMARY OF THE INVENTION

By way of introduction only, the present invention provides a transparent method for secure file transmission from a first computing device of a sender to a second computing device of a recipient, the method comprises selecting a group, a recipient and a file at the first computing device, wherein the recipient is a member of the group and wherein the file is to be transmitted from the first computing device to the second computing device, selecting a lockbox option at the first computing device to securely transmit the file to a lockbox situated at the second computing device, iteratively selecting a location by performing a set of lockbox content version control operations at the first computing device until a valid location is selected, dispatching the file at the valid location and presenting an indication at the second computing device that the file is dispatched with the lockbox option, and displaying the file at the second computing device.

According to one aspect of the present invention, a transparent method for secure file transmission from a first computing device of a sender to a second computing device of at least one recipient is provided, the method comprising the steps of: selecting a group, at least one recipient and a file from the first computing device, wherein each of the at least one recipients has a recipient computing device to provide at least one recipient computing device and wherein each of the at least one recipients is a member of the group and wherein the file is to be transmitted from the first computing device to at least one recipient computing device; selecting a lockbox option at the first computing device to securely transmit the file to a lockbox situated at the at least one recipient computing device to provide lockbox contents of at least one file; iteratively selecting a location on at least one recipient computing device where the file is to be dispatched by performing a set of lockbox content version control operations at the first computing device until a valid location on the at least one recipient computing device is selected; dispatching the file at the valid location and presenting an indication at each of the at least one recipient computing devices that the file is dispatched with the lockbox option; and displaying the file in response to at least one recipient selecting a view lockbox content option at the at least one recipient computing device.

According to another aspect of the present invention, a transparent file transmission system is provided establishing a secure communication link from a first computing device of a sender to at least one recipient computing device of at least one recipient, the system configured to perform the following operations: select a group, at least one recipient and a file from the first computing device, wherein each of the at least one recipients has a recipient computing device to provide at least one recipient computing device, wherein each of the at least one recipients is a member of the group and wherein the file is to be transmitted from the first computing device to the at least one recipient computing device; select a lockbox option at the first computing device to securely transmit the file to a lockbox situated at the at least one recipient computing device to provide lockbox contents of at least one file; iteratively select a location on the at least one recipient computing device by performing a set of lockbox content version control operations at the first computing device until a valid location is selected, wherein the location is situated on the at least one recipient computing device where the file is to be dispatched; dispatch the file at the valid location at the at least one recipient computing device and presenting an indication at each of the at least one recipient computing devices that the file is dispatched with the lockbox option; and display the file in response to the recipient selecting a view lockbox content option at the at least one recipient computing device.

The foregoing discussion of the preferred embodiments has been provided only by way of introduction. Nothing in this section should be taken as a limitation of the claims, which define the scope of the invention.

BRIEF DESCRIPTION OF SEVERAL VIEWS OF THE DRAWINGS

FIG. 5 depicts an alert links interface according to a preferred embodiment of the disclosed system;

FIG. 6 illustrates the selection of the lockbox option according to a preferred embodiment of the disclosed system;

FIG. 7 depicts the interface where the sender designates a destination location on the recipient's device;

FIG. 8 shows version control operations according to one embodiment of the disclosed invention;

FIG. 15 depicts an exemplary interface resulting from the sender selecting a lockbox items link 1410 in FIG. 14;

FIG. 17 depicts an interface presenting file download status information;

FIG. 21 shows the output of the report whose attributes are configured in FIG. 20;

DETAILED DESCRIPTION OF THE INVENTION

The present disclosure describes computer implemented systems and methods, that may utilize an algorithm, for use in a graphical user interface employing secure file transmission from a first computing device of a sender to a second computing device of a recipient, the method comprises selecting a group, a recipient and a file at the first computing device, wherein the recipient is a member of the group and wherein the file is to be transmitted from the first computing device to the second computing device, selecting a lockbox option at the first computing device to securely transmit the file to a lockbox situated at the second computing device, iteratively selecting a location by performing a set of lockbox content version control operations at the first computing device until a valid location is selected, dispatching the file at the valid location and presenting an indication at the second computing device that the file is dispatched with the lockbox option, and displaying the file at the second computing device. As would be understood by one of ordinary skill in the art, every aspect of the present invention may be implemented by a computing device and it would likely be numerous computing devices. The term computing device and/or device may include, without limitation, a personal computer, laptop, handheld device, smart phone, Iphone®, Ipad®, Galaxy® or any other device that may be introduced in the future.

Figure 1:
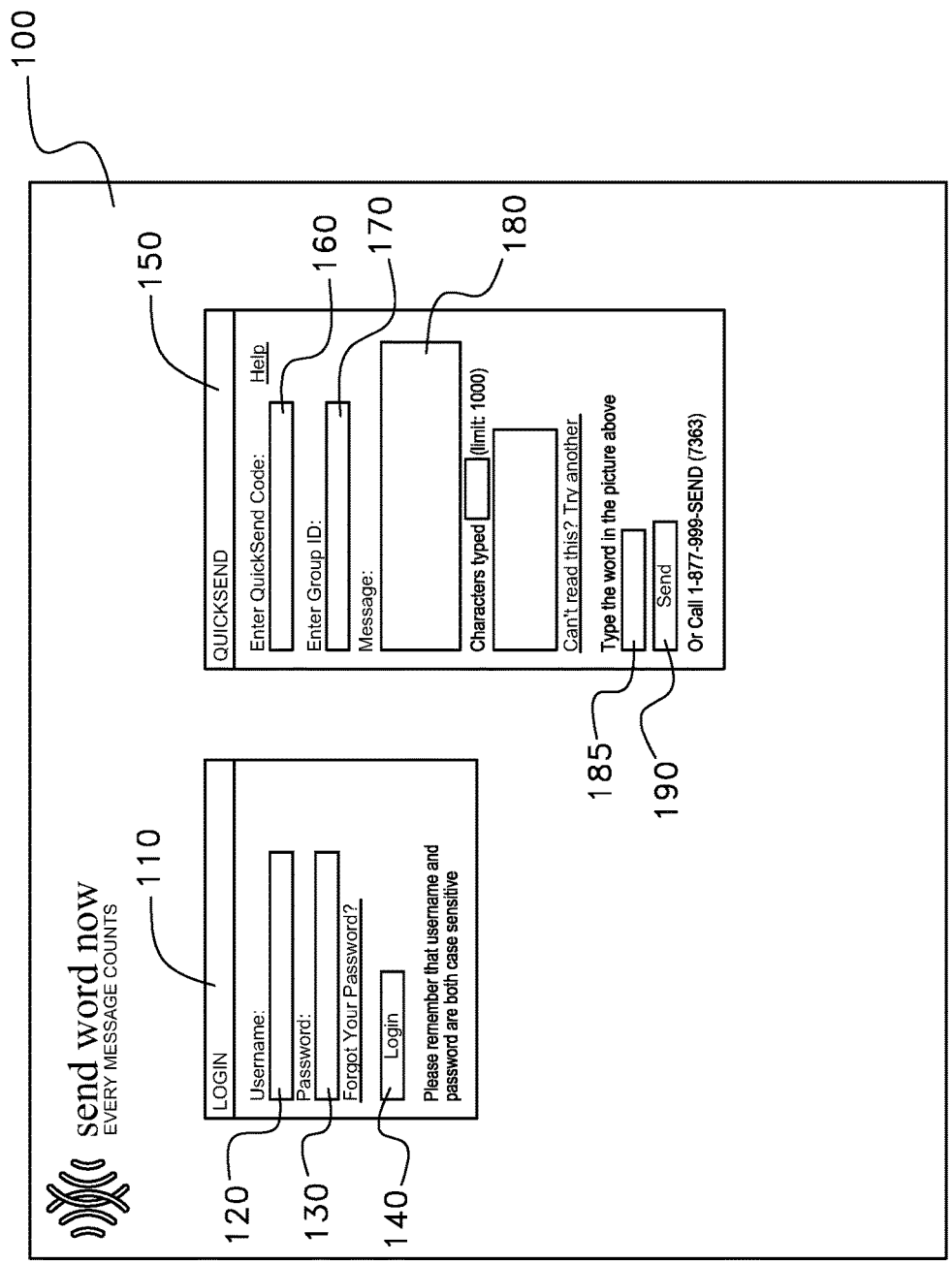
FIG. 1 depicts a user credential verification interface of the disclosed system.

Now referring to FIG. 1 depicting a user credential verification interface 100 according to a preferred embodiment of the disclosed invention. The disclosed communication system is a secured file transmission system. Accordingly, login interface 110 may include user name input area 120 and password input area 130 where a sender may input username and password for validation purposes. Then the sender may select login option 140 to continue the validation process before using the secured file transmission system. Alternatively, the sender may use Quicksend interface 150 to send a message by providing quicksend code 160 and group id 170 before entering message in the message input area 180. Sender may be required to enter text in input area 185 to ensure that the given input is provided by a human being and not by a machine. The sender may then select submit option 190 to conclude the credentials input process.

Figure 2:
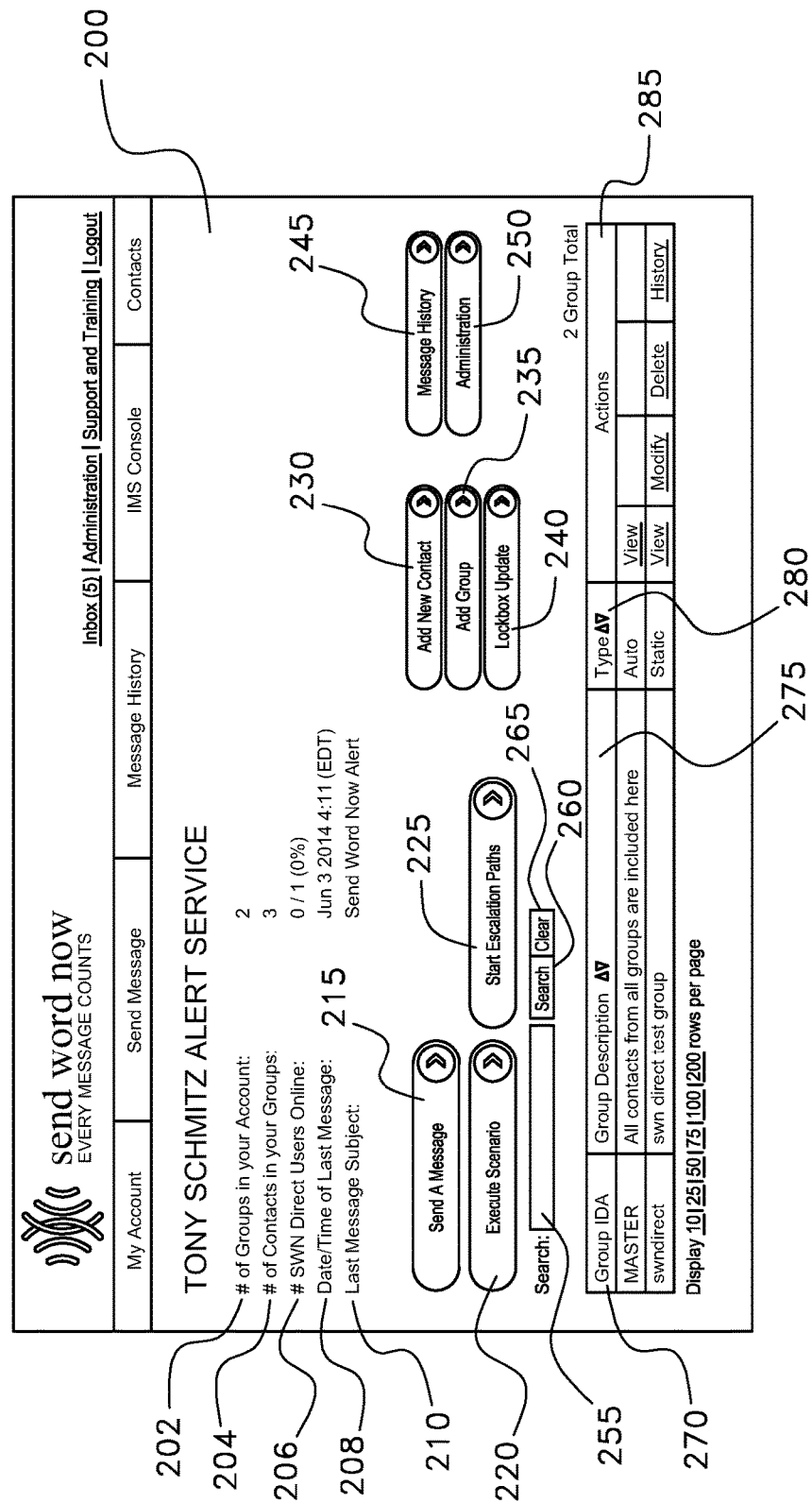
FIG. 2 illustrates alert service main interface according to a preferred embodiment of the disclosed system.

FIG. 2 illustrates alert service main interface 200 according to the preferred embodiment of the disclosed system. Upon successful login into the system, alert service main interface 200 is displayed to the sender. Interface 200 depicts number of groups in sender account 202, total number of contacts in the sender's group 204, and total number of direct users online 206. Further, interface 200 also indicates date and time of last message 208 and subject of last message 210. This feature informs a sender how many direct users are online even before the sender designates a recipient or selects a file to be transmitted to the recipient. Unlike conventional file transmission systems, where sender does not know whether or not the target recipient is on line, and reachable, the disclosed system has ability to precisely inform the sender of the recipient's online or offline status.

This is also referred to "on-net" and "off-net." A member is shown as an online member if the member has direct application installed on their phone, the member's phone is turned on and there is a Wi-Fi or Cellular Data connection. The master group may comprise the entire group members while direct group may include the members of direct group. A static group may be formed by placing members in a group based on the member's identity. A dynamic group may be formed based on attributes that define people. For example, a dynamic group may include all lawyers, all passengers on Metra, all sailors in lake Michigan. It is often critical to address a group of people during an emergency.

A sender may select send message option 215 to send a message, or create a test scenario by selecting option 220. Alternatively, the sender may start escalation procedures by selecting start escalation procedures option 225. Additionally, the sender may add new contact, add new group, view lockbox updates, view message delivery attributes, and perform administrative functions by selecting options 230, 235, 240, 245, and 250 respectively. The sender may conduct a search for a group name or a recipient name by entering the group or recipient name in the input area 255 and selecting search option 260. The text entered in the input area 255 can be purged by selecting clear option 265. The interface 200 displays group id 270, group description 275, group types 280 and actions 285 that can be performed on the listed groups. Two groups, master and swndirect are listed on the interface 200. Upon selecting the send a message option 215, the interface 300 illustrated in FIG. 3 is displayed to the sender.

Figure 3:
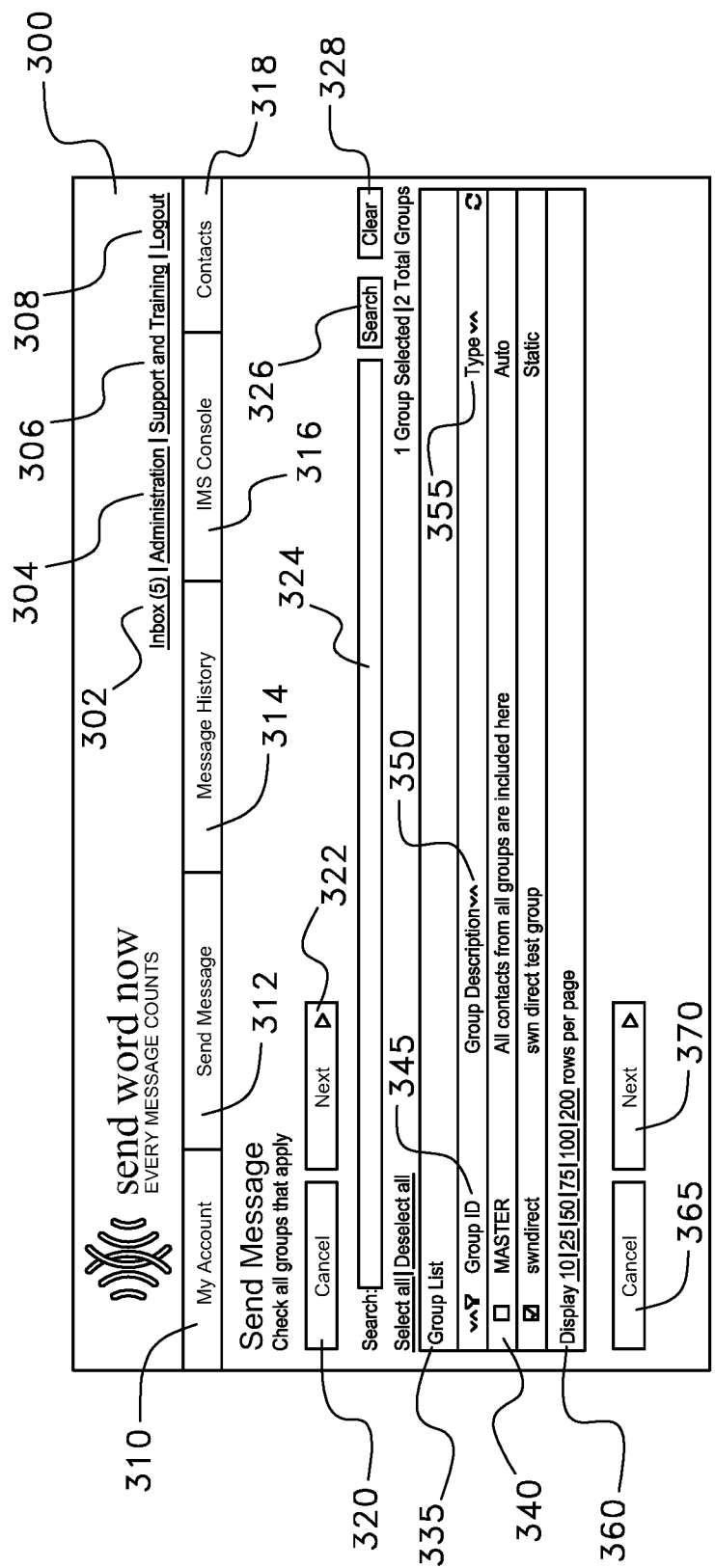
FIG. 3 depicts send message interface according to a preferred embodiment of the disclosed system.

FIG. 3 depicts a send message main interface 300 for selecting a group according to the preferred embodiment of the disclosed system. The sender may view inbox items by selecting inbox option 302, perform administrative functions by selecting administration option 304. The support and training can be performed by selecting support and training option 306. Likewise, the sender can log out of the system by selecting logout option 308. The sender account details can be viewed by selecting my account option 310, sender may dispatch a text or voice message by selecting send message option 312. The sender may review message history by selecting message history option 314, and launch IMS console by selecting option 316 or contact customer service by selecting contact us option 318. The sender may proceed with sending a message by selecting next options 322 and 370 or abort message transmission by selecting cancel options 320 and 365.

The sender may conduct a search for a group name or a recipient name by entering the group or recipient name in the input area 324 and selecting search option 326. The text entered in the input area 324 can be purged by selecting clear option 328. The interface 300 displays group id 335, group description 350, group types 355 and group selection box 340 that can be used to select the listed groups. Page display can be configured by selecting display option 360. Two groups, master and swndirect are listed and group swndirect is selected on the interface 300.

Figure 4:
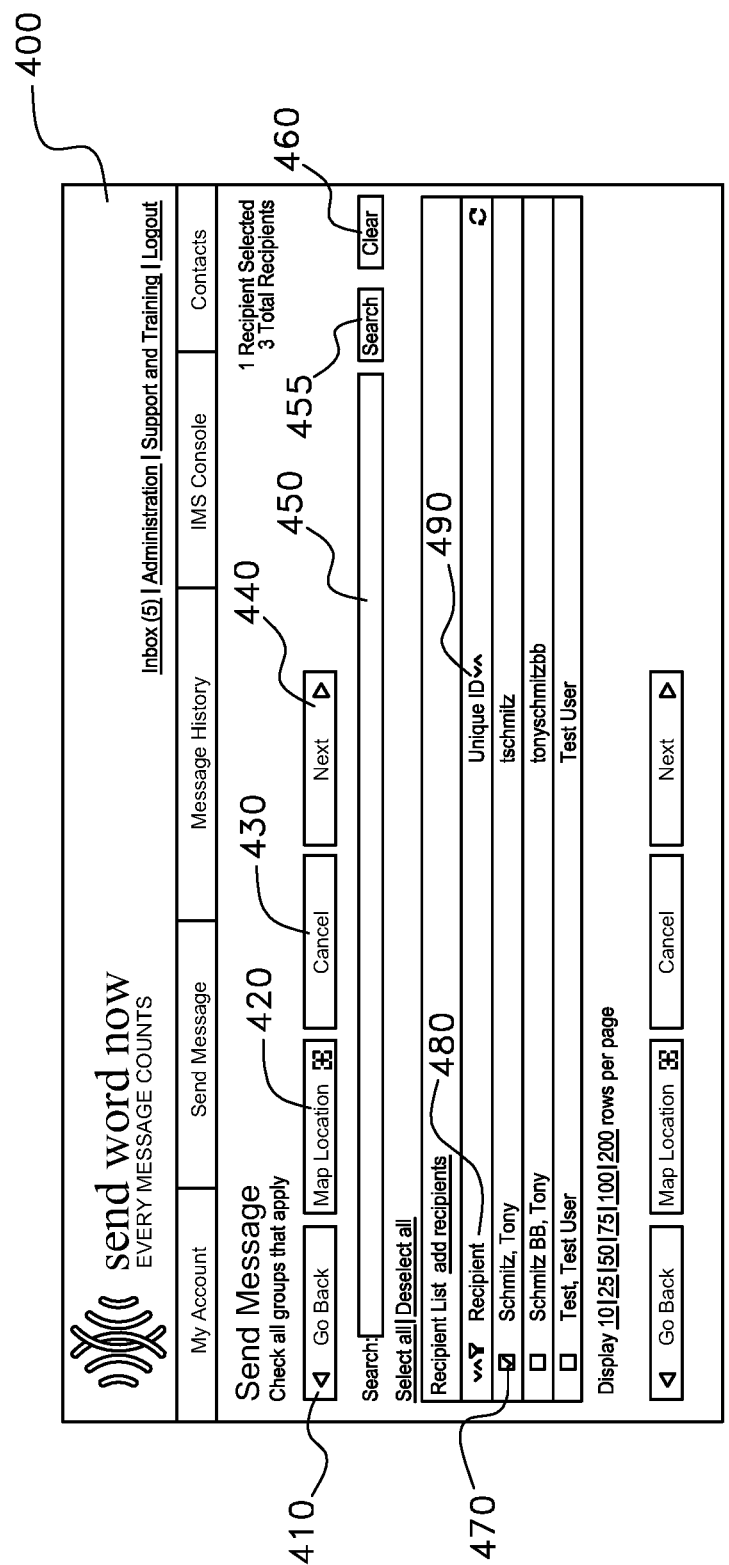
FIG. 4 depicts recipient selection interface according to a preferred embodiment of the disclosed system.

FIG. 4 depicts recipient selection main interface 400 according to the preferred embodiment of the disclosed system. From interface 400, the sender may go back to selecting group interface 300 by selecting go back option 410, sender may map location of the selected recipient by selecting map location option 420. The sender may proceed with sending message by selecting next option 440 or abort message transmission by selecting cancel option 430. The sender may conduct a search for a group name or a recipient name by entering the group or recipient name in the input area 450 and selecting search option 455. The text entered in the input area 450 can be purged by selecting clear option 460. The interface 400 further illustrates recipient name 480, unique id 490, and selection box 470 that can be checked to select the listed recipients. Three recipients are listed on the interface 400. Upon selecting next option 440 on interface 400, the interface 500 illustrated in FIG. 5 is displayed to the sender.

FIG. 5 depicts alert links interface 500 according to the preferred embodiment of the disclosed system. The sender may select alert links option 510 on the interface to select a file to be transmitted to a recipient previously selected on the interface 400. Various functionalities such as 'specify devices' and 'get word back' are illustrated on the interface 500, which are described in a co-pending patent application. The sender may select the alert links option 510 to cause display of alert links window 520. The sender may select a file located on the sender's computing device, which is referred to herein as a first computing device by browsing the directory structure of the first computing device. A filename 530 may appear in the alert links window along with the file upload status 540. When the file upload is pending the status 540 may indicate 'pending' or 'in progress' and upon upload completion, the status may change to 'complete' to indicate the file has been uploaded.

The sender may go back to selecting recipient interface 400 by selecting go back option 580, sender may perform spell check of the test entered on interface 500 by selecting spell check option 592. The sender may proceed with sending message by selecting send message option 594 or abort message transmission by selecting cancel option 590. After uploading a file, the sender may select option add alert link option 570 to add another file. Alternatively the sender can abort the file upload by selecting trash icon 550 or the sender can select to dispatch the securely dispatch the selected file with a lockbox option by selecting lockbox option 560. Selection of lockbox option 560 causes display of interface 600 illustrated in FIG. 6.

FIG. 6 depicts alert links interface 600 according to the preferred embodiment of the disclosed system. The sender may select a custom from 602 for composing a message. The sender can specify message subject in the input area 604. The sender may input message text in the input area 608. Then the sender may specify devices 612 where the file is to be dispatched. In other words, the sender may select all of the recipient's devices for dispatching the file by selecting option 616. Alternatively, the sender may only select recipient's voice devices for dispatching the file by selecting option 618. Likewise, the sender may choose recipient's text devices for dispatching the file by selecting option 620.

Alternatively, the sender may select a specify devices option 622 to select at least one of: the recipient's express voice device option 624, the recipient's express messenger device option 626 or the recipient's office email device option 628 for dispatching the composed message. Selecting the lockbox option 610 causes display of interface 700 illustrated in FIG. 7.

FIG. 7 illustrates the interface where the sender designates a destination location where the file being transmitted from a first computing device to the recipient's device, which is also referred to as a second computing device. In other words, the destination location 710 on the interface 700 is a location on the second computing device where the selected file is to be placed. Directory path 720 indicates the precise path of the destination address. Accordingly, the sender iteratively selects a location by performing a set of lockbox content version control operations at the first computing device until a valid location is selected, wherein the location is situated on the second computing device where the file is to be dispatched.

As shown in FIG. 7, the .pdf file 730 is selected and the file is being transmitted to the location root/emergency response/first responders/demo folder if the placement satisfies a set of version control. This allows sender to send to an intended recipient (or recipients) a subsequent version of a file to replace a previous version of the file wherein the previous version and the subsequent version have identical name. Maintaining only the latest version of a file may prevent clogging up the recipient's communication device with several outdated versions of a file of interest. The sender may select to save the selected lockbox destination by selecting option save 740 or abort the selection by selecting option cancel 750. Upon selecting option save 740, the interface 800 illustrated in FIG. 8 is displayed.

The manner in which the disclosed method may perform the version control operations is depicted in FIG. 8. The set of lockbox content version control operations comprise determining select a destination folder at the whether a duplicate file exists at the location on the second computing device such that the name of the file the sender is intending to dispatch is identical to the name of the file already present at the location on the second computing device. If a duplicate file exists at the second computing device then an indication is displayed at the first computing device. The set of lockbox content version control operations may prompt the sender to select another folder option 820 to designate an alternate location on the second computing device if the duplicate file exists at the previously selected location on the second computing device. However, the set of lockbox content version control operations may present the sender overwrite duplicate file option 810 on the second computing device option if the alternate location is not selected. Finally, the set of lockbox content version control operations may prompt the sender to abort the file dispatch to the second computing device by selecting the cancel option 830 if neither the alternate path nor the overwrite option is selected.

Figure 9:
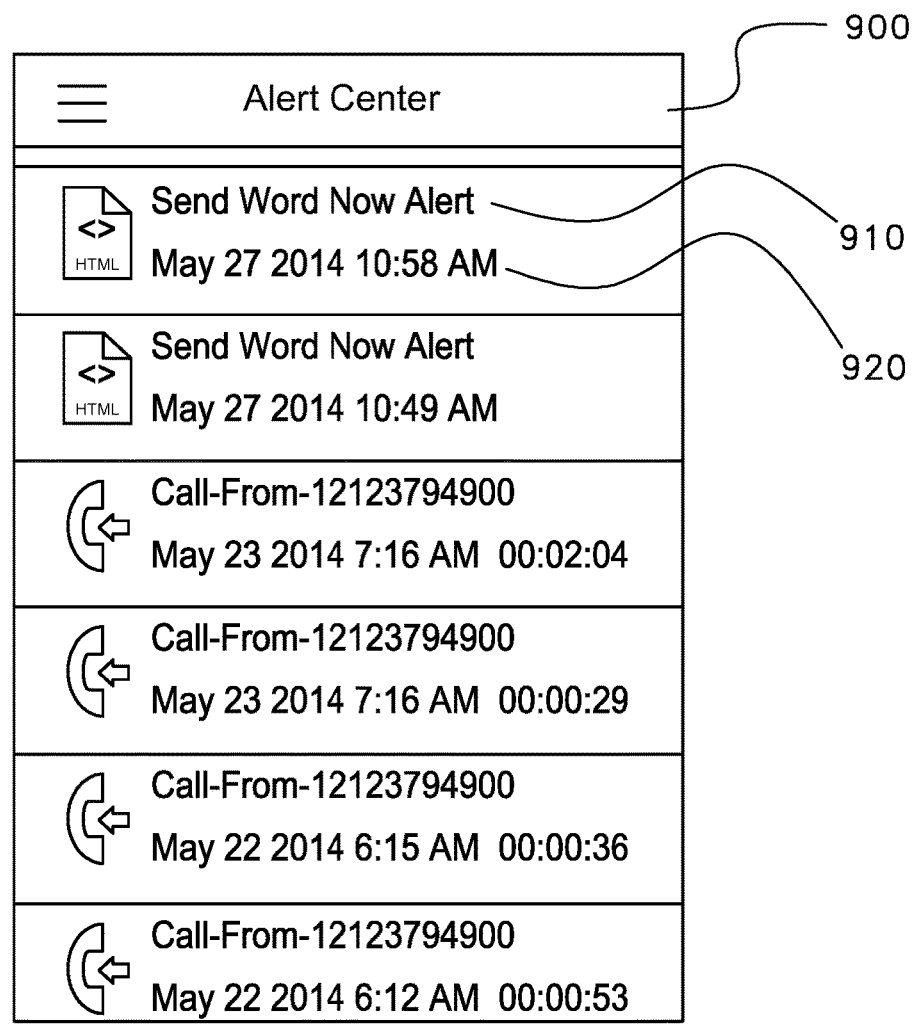
FIG. 9 illustrates an example of file dispatch indication according to one embodiment of the disclosed invention.

In an event the sender selects an alternate valid location on the second computing device then the disclosed method may dispatch the file at the valid location on the second computing device while presenting an indication at the second computing device. An example of file dispatch indication interface 900 is depicted in FIG. 9. The second computing device, in this example is a mobile or cellular phone of the recipient. The terms mobile phone and cellular phone are equivalent. Indication 910 denotes that that a file is dispatched at the recipient's cellular phone with the lockbox option on date and time stamp 920, which is shown as May 27, 2014 at 10:58 AM.

Figure 10:
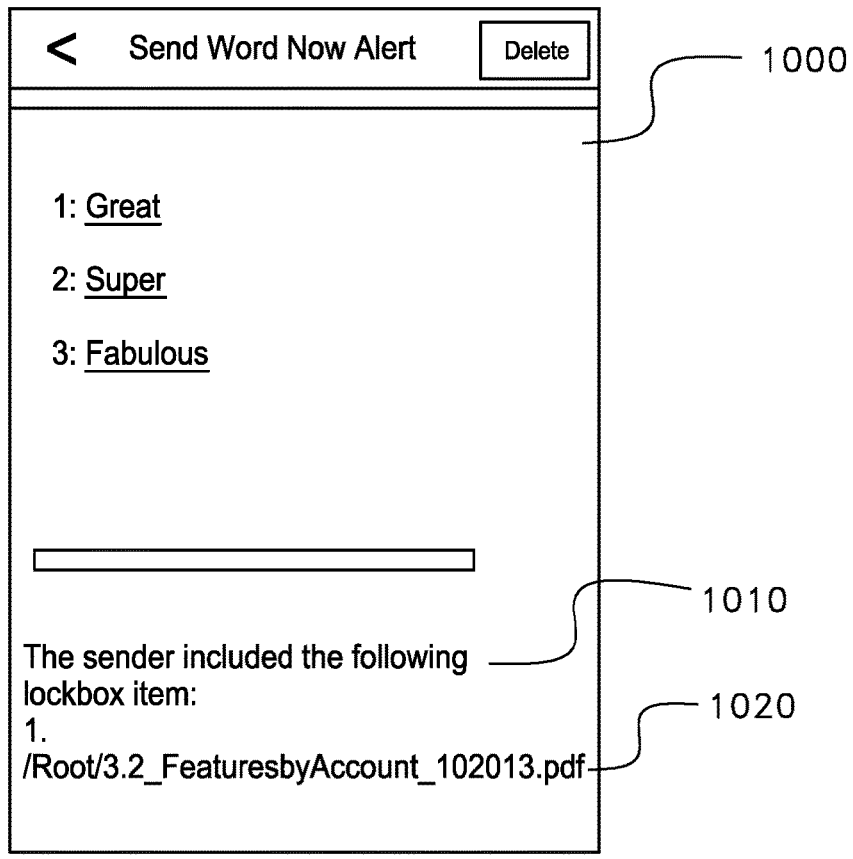
FIG. 10 depicts a lockbox item notification interface according to one embodiment of the disclosed invention.

Interface 1000 as illustrated in FIG. 10 is displayed when the recipient selects the indication 910. Notably, a second file dispatch notification 'the sender has included the following lockbox item' 1010 is displayed on the interface 1000. Additionally, the second file dispatch notification 1020 is displayed indicating where the dispatched file is located is indicated on the second computing device.

Figure 11:
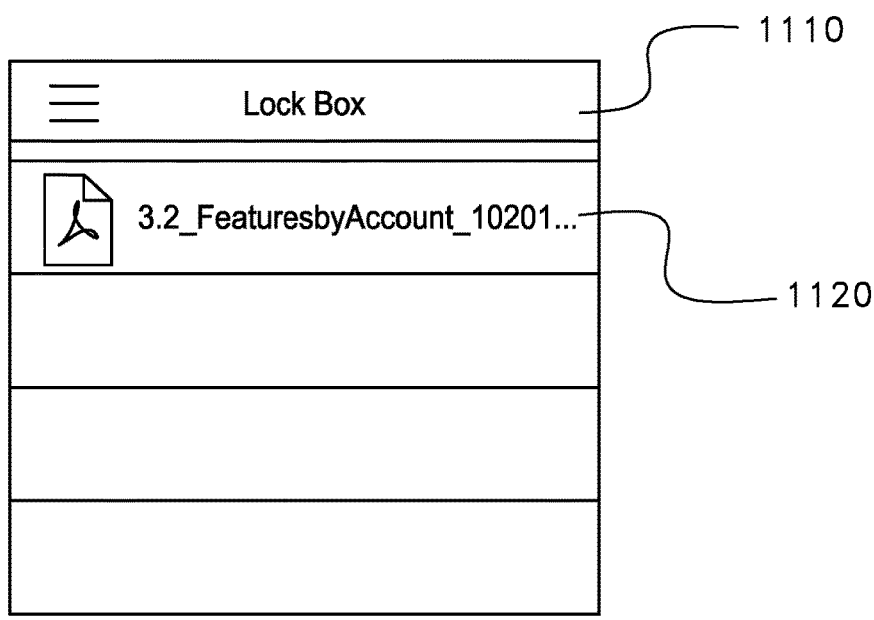
FIG. 11 shows lockbox contents of the second computing device upon receiving the file from the first computing device.

FIG. 11 depicts lockbox contents of the second computing device upon receiving the file from the first computing device. Interface 1110 as shown in FIG. 11 is displayed upon the recipient selecting the second file dispatch notification 1020 shown in FIG. 10. Accordingly, lockbox contents of the second computing device are displayed in response to the recipient selecting the second file dispatch notification.

Figure 12:
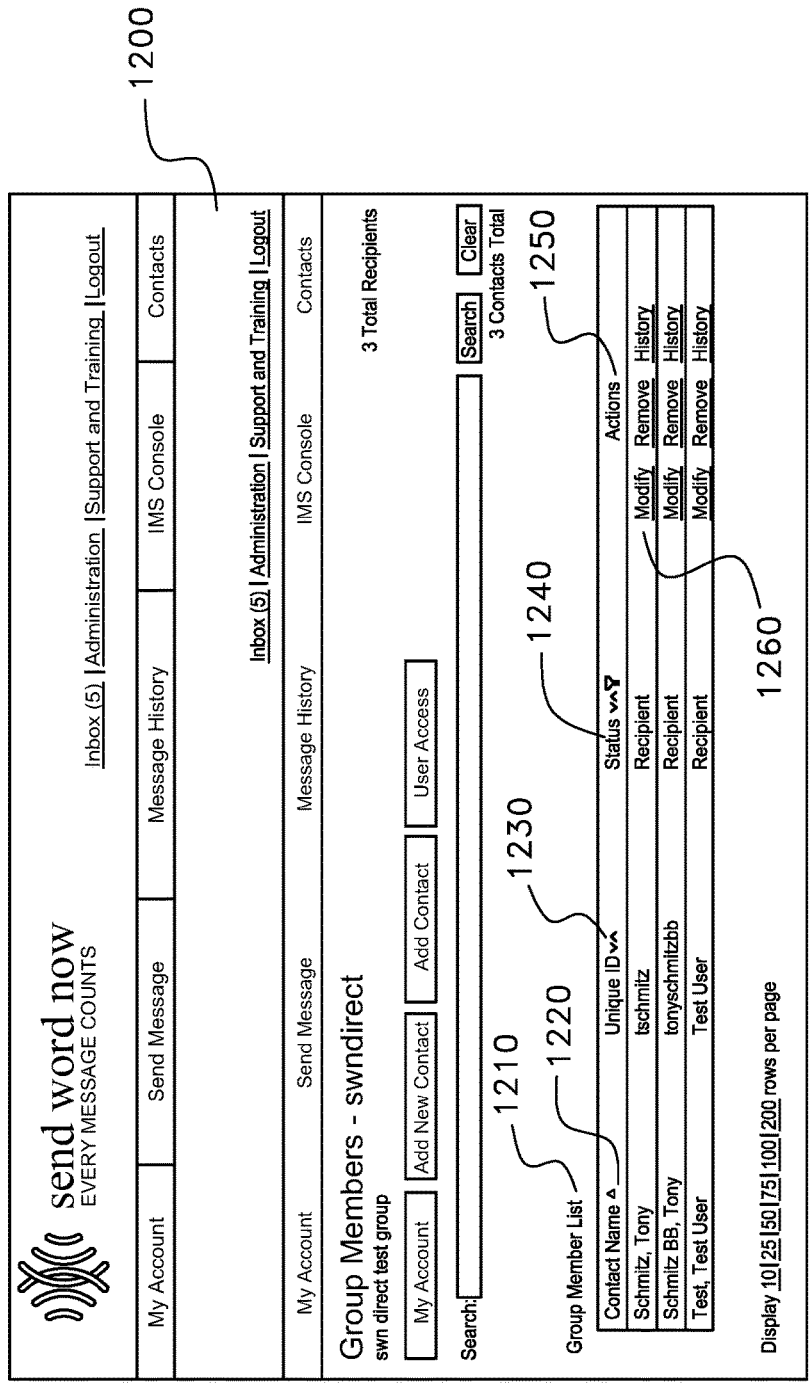
FIG. 12 depicts an interface resulting from the sender selecting a view link action option for the direct group in FIG. 2.

FIG. 12 depicts an interface resulting from the sender selecting a view link action option 285 for the direct group in FIG. 2. Now referring back to FIG. 2, where the sender is able to select from four options for direct group. The options are view, modify, delete and history. If the sender selects the view action option 285 for the direct group in FIG. 2, then the interface 1200 illustrated in FIG. 12 is displayed to the sender.

The interface 1200 may present group member list 1210 displaying information about the members of the group direct. In particular, the interface 1200 may display contact name 1220, unique identification of the contact 1230, status indicator of the contact 1240 and actions 1250 that can be performed on a given contact. In other words, the sender may remove a contact, modify a contact or view history of a contact. If the sender selects the modify option 1260 for the Tony Schmitz, then the interface 1300 illustrated in FIG. 13 is displayed to the sender.

Figure 13:
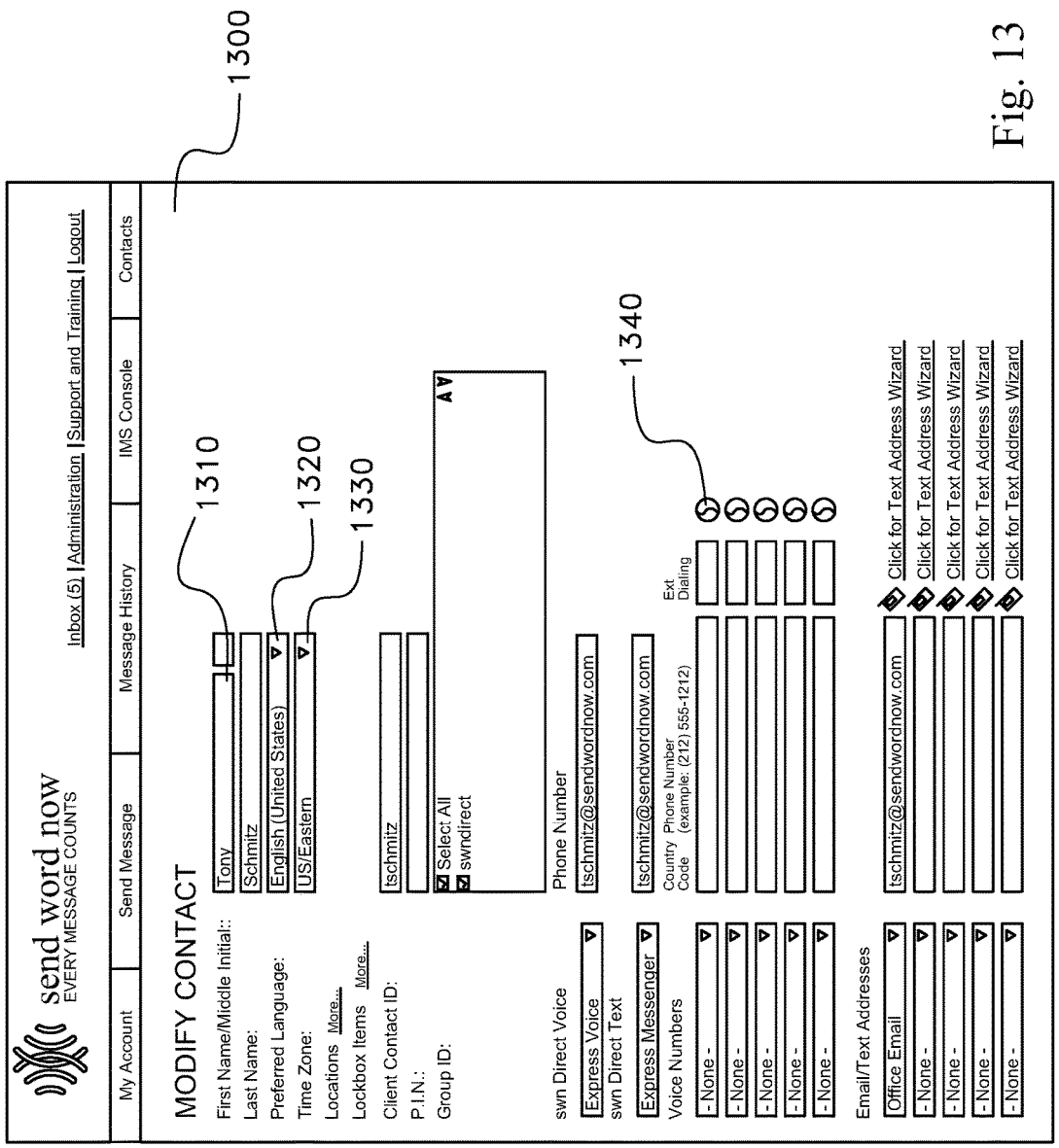
FIG. 13 shows a modify contact interface according to a preferred embodiment of the disclosed invention.

FIG. 13 shows a modify contact interface according to a preferred embodiment of the disclosed invention. Interface 1300 as shown in FIG. 13 is displayed if the sender selects a modify option 1260 in FIG. 12 for contact named Tony Schmitz. The interface 1300 may allow the sender to change name option for the contact 1310, change language option for the contact 1320, change time zone settings option for the contact 1330, change phone number option for the contact 1340 for modifying the contact information for contact Tony Schmitz.

Figure 14:
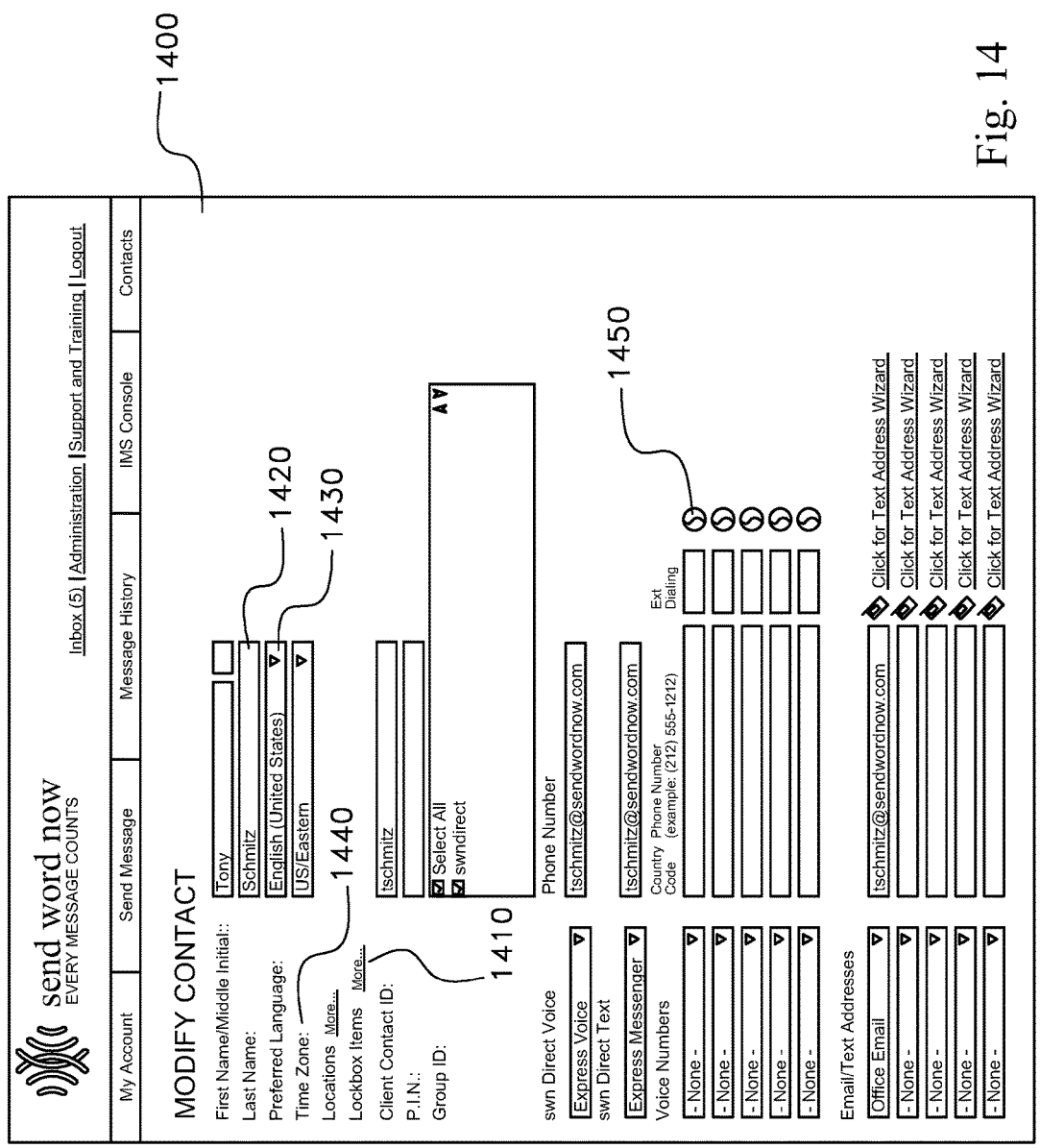
FIG. 14 depicts a modify contact information interface according to a preferred embodiment of the disclosed invention.

FIG. 14 depicts a modify contact information interface according to a preferred embodiment of the disclosed invention. Through interface 1400 the sender can modify contact information such as name 1420, language 1430, time zone settings 1440, phone number 1450, and the like information for a selected contact. The sender may select a lockbox items link 1410 causing the display of the interface 1500 as shown in FIG. 15.

Figure 15:
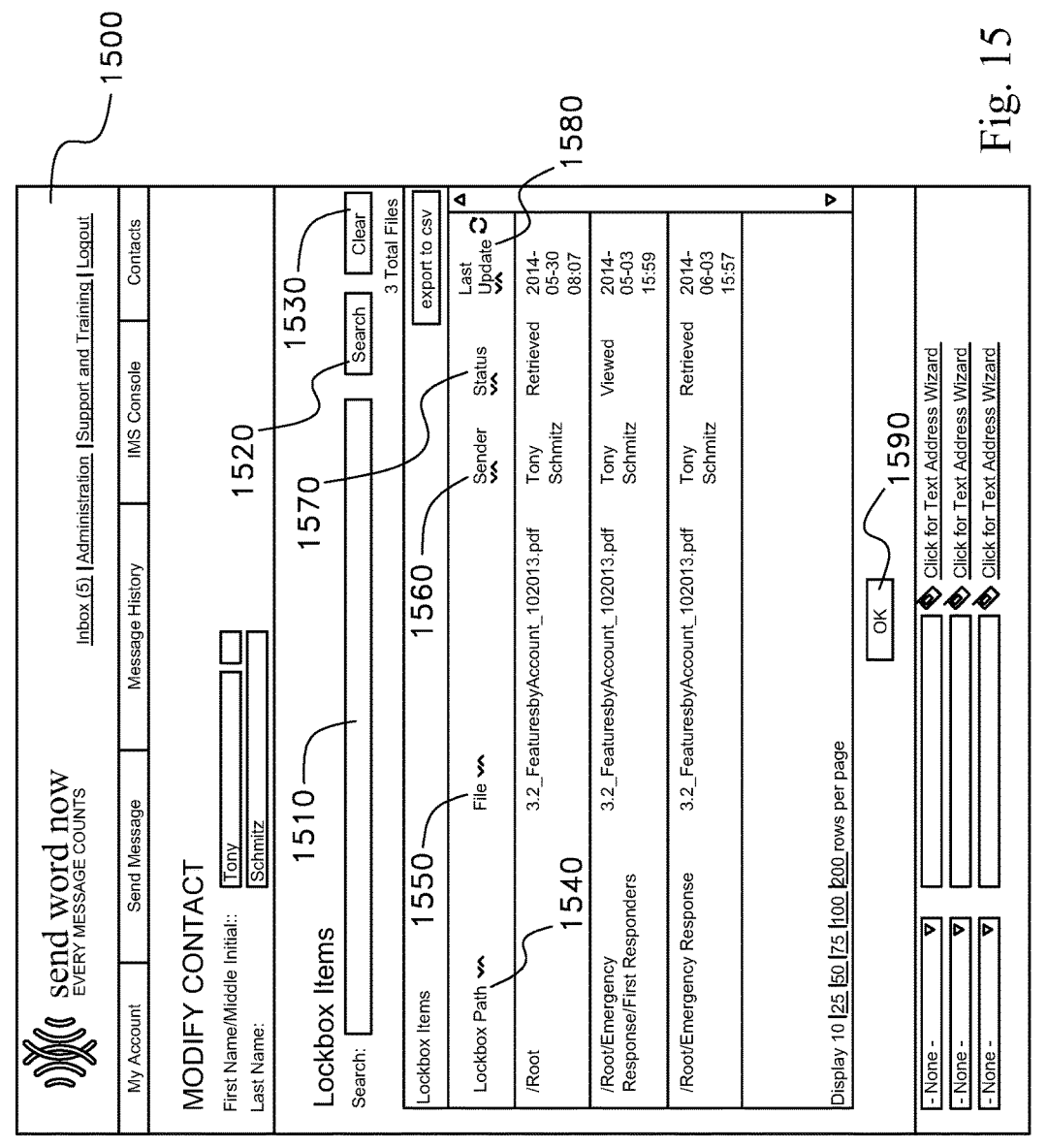

Now referring to FIG. 15 where the sender can conduct a search by entering search criteria in the input area 1510 and selecting search option 1520. The text entered in the input area 1510 can be purged by selecting clear option 1530. The interface 1500 may display information pertaining to a given lockbox such as lockbox path 1540, file name 1550, sender name 1560, dispatch status 1570, last update time stamp 1580 and the like. A file can be selected from a list of files displayed on the interface 1500 and by selecting option ok 1590.

Figure 16:
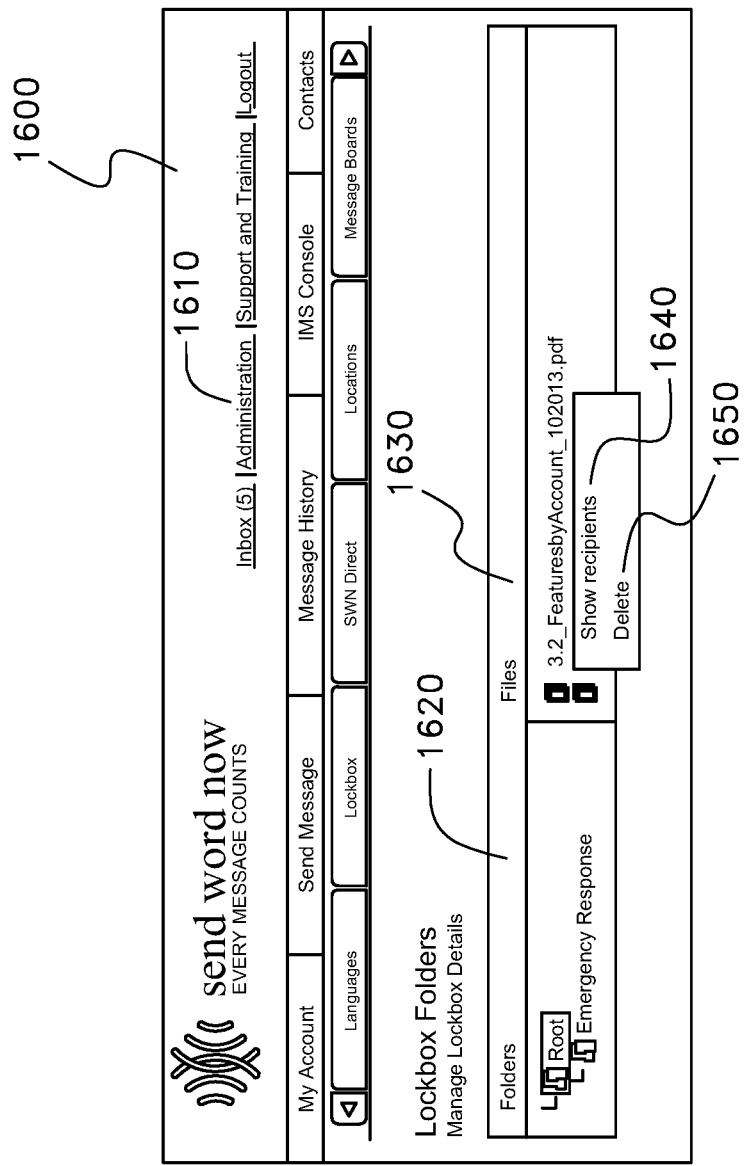
FIG. 16 shows an exemplary interface of sender viewing lockbox contents of a recipient's lockbox in an administrative mode.

Alternatively, the sender may select to view lockbox contents of a recipient's lockbox in an administrative mode. FIG. 16 depicts interface 1600 showing an example of a sender viewing lockbox contents of a recipient's lockbox in an administrative mode. After designating administration mode by selecting administration option 1610, the sender may view a directory structure of the lockbox folders 1620 of a given recipient along with files 1630 located in the folder. The sender is presented two options in regards to the listed files. The sender may select a show recipient option 1640 to view names of the recipient who received the file, or the sender may use a delete file option 1650 to delete the selected file. The selection of show recipient option 1640 may further cause display of interface 1700 as shown in FIG. 17.

Figure 17:
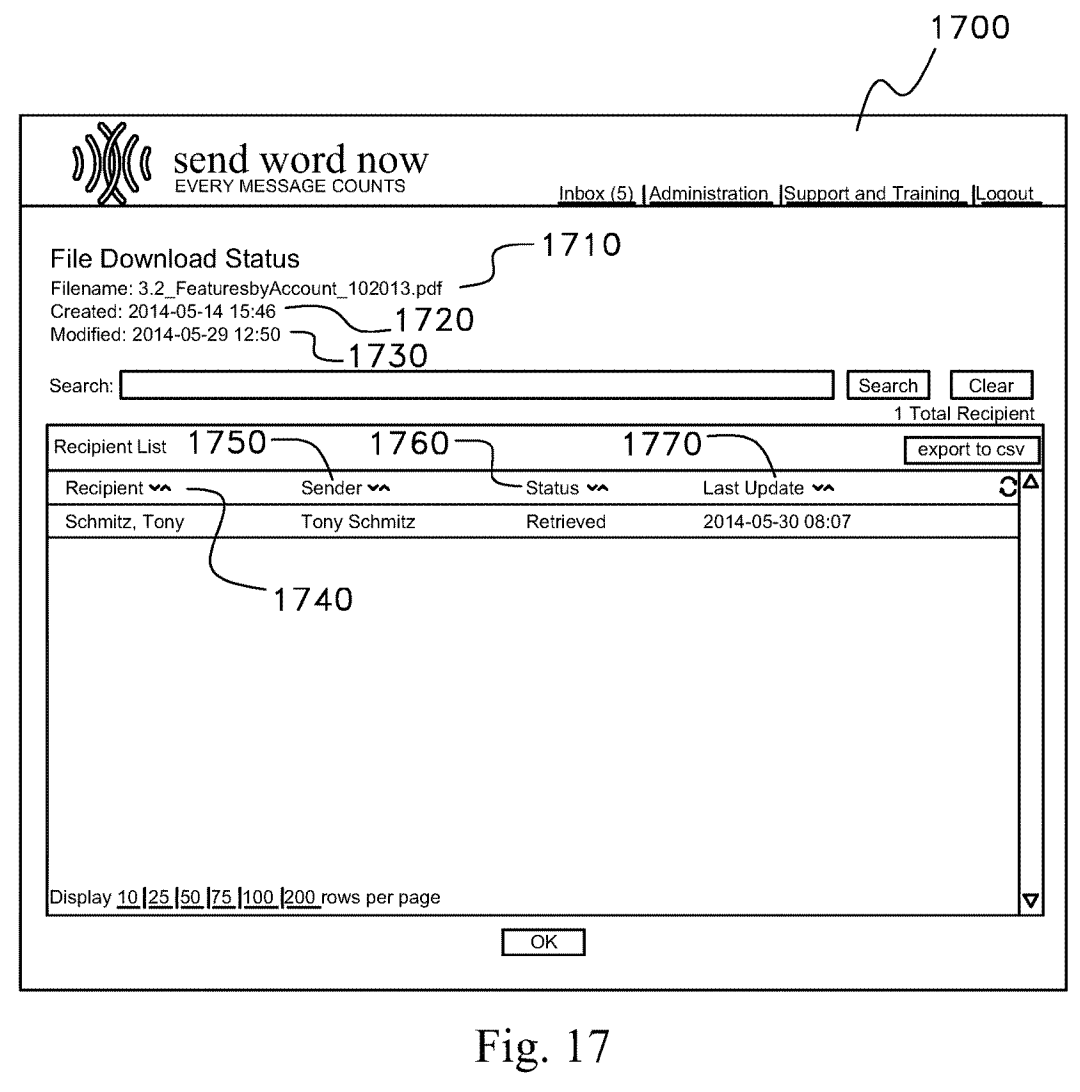

FIG. 17 illustrates interface 1700 presenting file download status information such as filename 1710, date when file was created 1720, date when file was last modified 1730. Furthermore, the interface 1700 may also list recipient name 1740, sender name 1750, dispatch status 1760, last update time stamp 1770 and the like.

Figure 18:
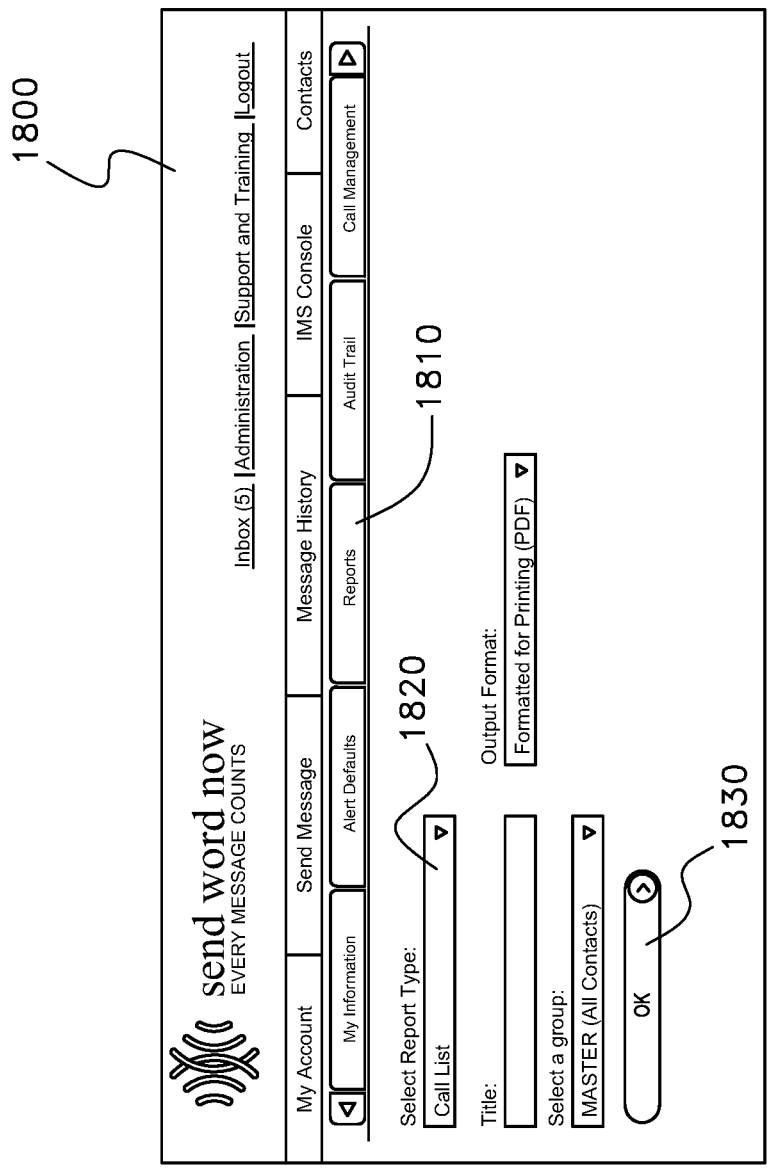
FIG. 18 illustrates report operations performed by the sender in an administration mode according to one embodiment of the disclosed invention.

FIG. 18 illustrates report operations performed by the sender in an administration mode according to one embodiment of the disclosed invention. While in the administration mode, the sender may run reports on a contact's lockbox as shown in interface 1800 in FIG. 18. The sender may select to run reports by selecting reports option 1810 on the interface 1800. The sender may select to run a specific type of report by selecting a specific report type from the report type list 1820 and by selecting ok option 1830.

Figure 19:
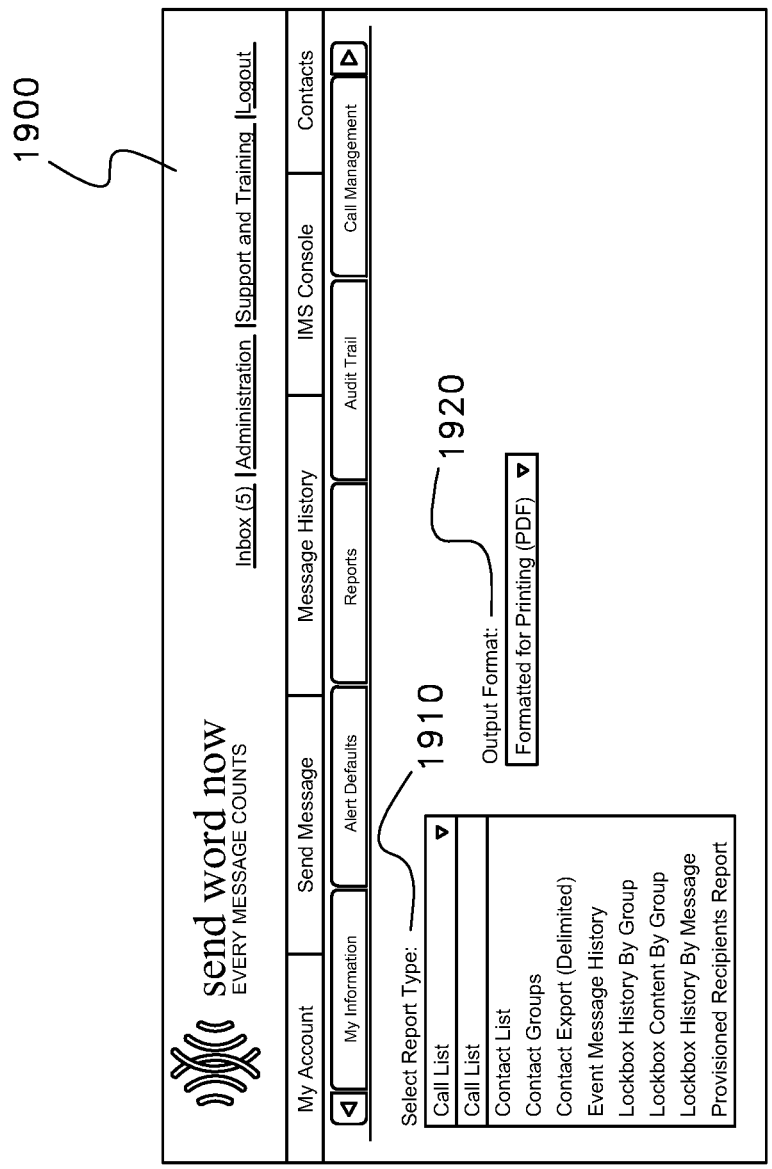
FIG. 19 displays various report types that may be run by the sender according to one embodiment of the disclosed invention.

FIG. 19 displays various report types that may be run by the sender according to one embodiment of the disclosed invention. Interface 1900 in FIG. 19 displays several report types 1910. For example, the sender may run reports based on several criteria including but not limited to call list, contact list, contact groups, contact export, event message history, lockbox history by group, lockbox contents by group, lockbox history by message, and provisioned recipient's report. After selecting the report type 1910 on the interface 1900, the sender may specify output format 1920 of the selected report type. The output format 1920 is further described in FIG. 20.

Figure 20:
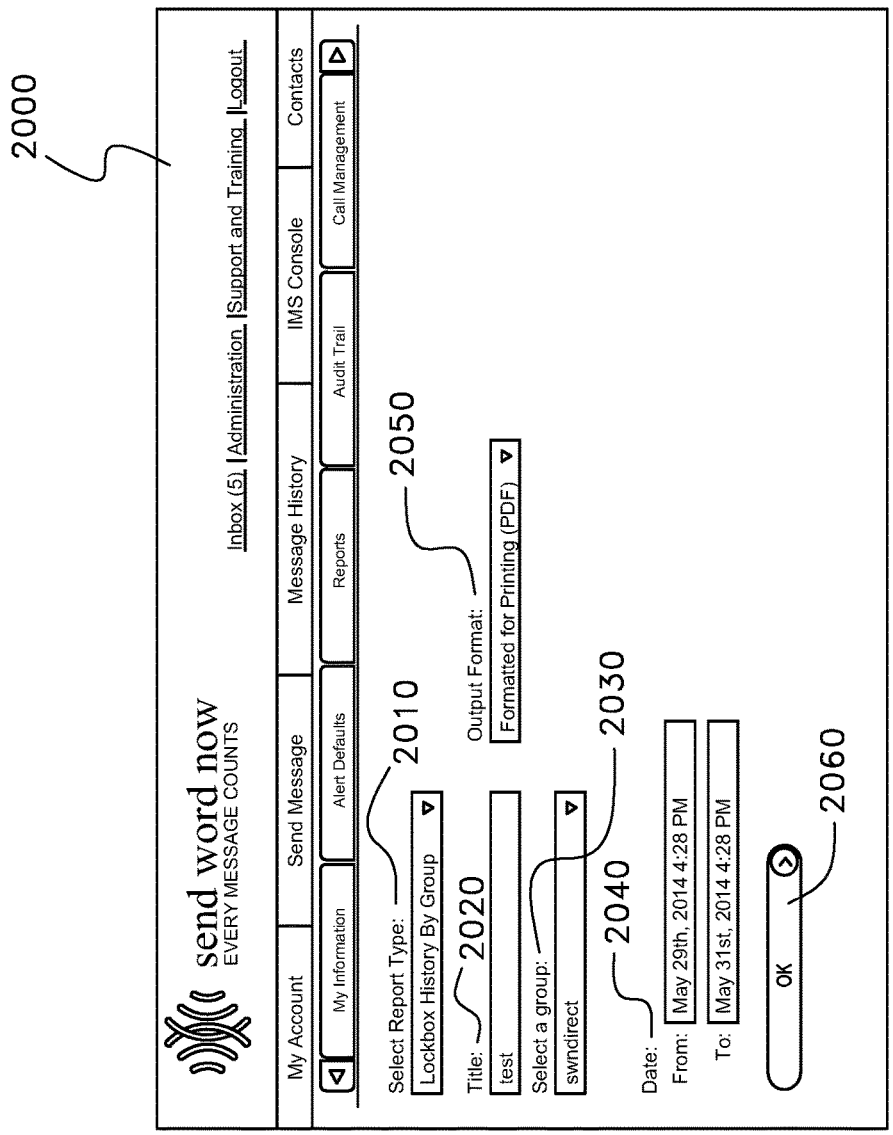
FIG. 20 depicts various report attributes that may be configured by the sender.

FIG. 20 displays various report attributes that may be configured by the sender via interface 2000. The interface 2000 illustrates report type 2010, report title 2020, group name 2030, report date 2040 and output format 2050. The sender may run a report after selecting above mentioned report attributes and selecting ok option 2060. Notably report date indicates data captured after a starting date and before an end date. Likewise, output format may include but are not limited to a ready for printing (.pdf) format, a comma separated values (.csv) format, Microsoft Excel 2003 (.xls) format, and Microsoft Excel 2003 (.xlsx) format. The output of the report whose attributes are configured in FIG. 20 is displayed in FIG. 21.

FIG. 21 depicts interface 2100 illustrating output of the report configured on the interface 2000. Remarkably, the sender may include attributes of interest to run lockbox reports and can specify a format that best suits them to display the report output. This ability to configure reports and specify output format can be crucial to businesses having large numbers of subscribers.

Figure 22:
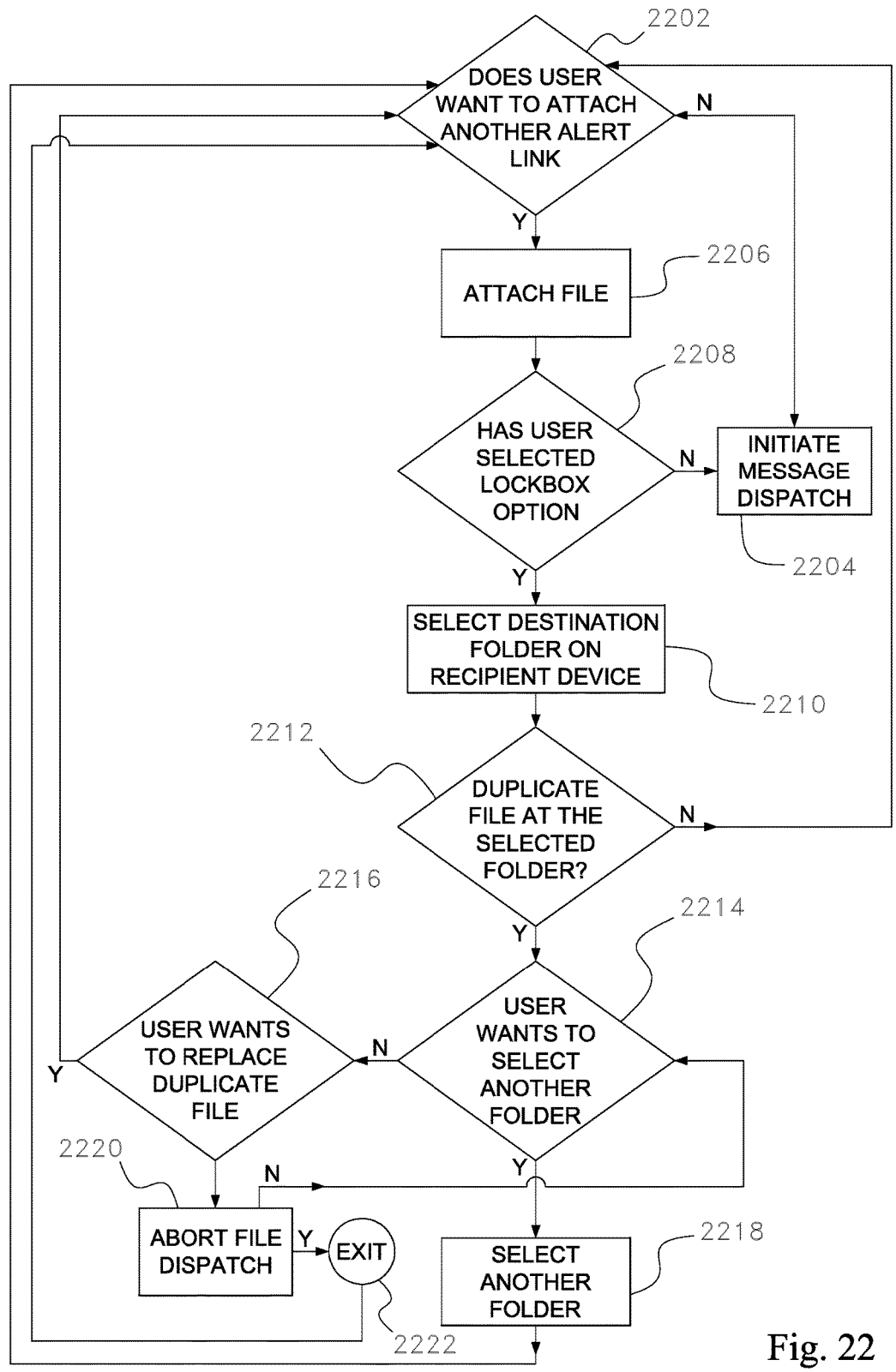
FIG. 22 shows a control flow chart depicting various operations performed while sending files according to a preferred embodiment of the disclosed invention.

FIG. 22 illustrates an exemplary control flow chart depicting various operations performed while sending files according to a preferred embodiment of the disclosed invention. At block 2202, the process ascertains if the sender wants to attach another alert link. Notably, an alert link is a file a sender intends to dispatch. Any valid MIME type files can be transmitted using the lockbox feature. According to another embodiment, any type of files (even those not yet created or known) can be transmitted using the lockbox feature. If the sender wants to attach another alert link, then the process moves to block 2206 to attach a file, otherwise the process moves to initiate the message dispatch at block 2204. At block 2206, the process attaches another file and moves to block 2208 to determine if the sender has selected lockbox option for sending the file. If the sender has selected lockbox option for sending the file, then the process moves to block 2210 to select destination folder on recipient device where the file lock is to be placed, otherwise the process moves to initiate the message dispatch at block 2204.

From block 2210 the process moves to block 2212 to check if duplicate file by the same file name exists at the destination folder. If the process determines that a duplicate file by the same file name exists at the destination folder, then the process moves to block 2214 to determine if the sender wants to select another folder, Alternatively, if the process determines at block 2212 a duplicate file by the same file name does not exist at the destination folder, then the process moves back to block 2202. At block 2214 if the process determines that the sender wants to select another folder, then the process moves to block 2218 to select another folder. After block 2218 the process moves back to block 2202. If at block 2214 the process determines that the sender does not wish to select another folder, then the process moves to block 2216 to determine whether sender wants to replace the duplicate file. At block 2216 if the process determines that the sender wants to replace the duplicate file, the process moves back to block 2202, otherwise the process exits at block 2222 after aborting the file dispatch at block 2220.

Advantageously, the disclosed method presents an economic file transmission system offering guaranteed delivery, diagnostic support, message tracking ability and return receipt notification. The disclosed method allows a user to access files when there is no Wi-Fi or Cellular Data connectivity. In addition, the users can transmit messages that are encrypted end-to-end and the disclosed method has the ability to enforce version control. Accordingly, in addition to providing file backup, the disclosed file transmission method securely transfers and stores files of all types.

Figure 23:
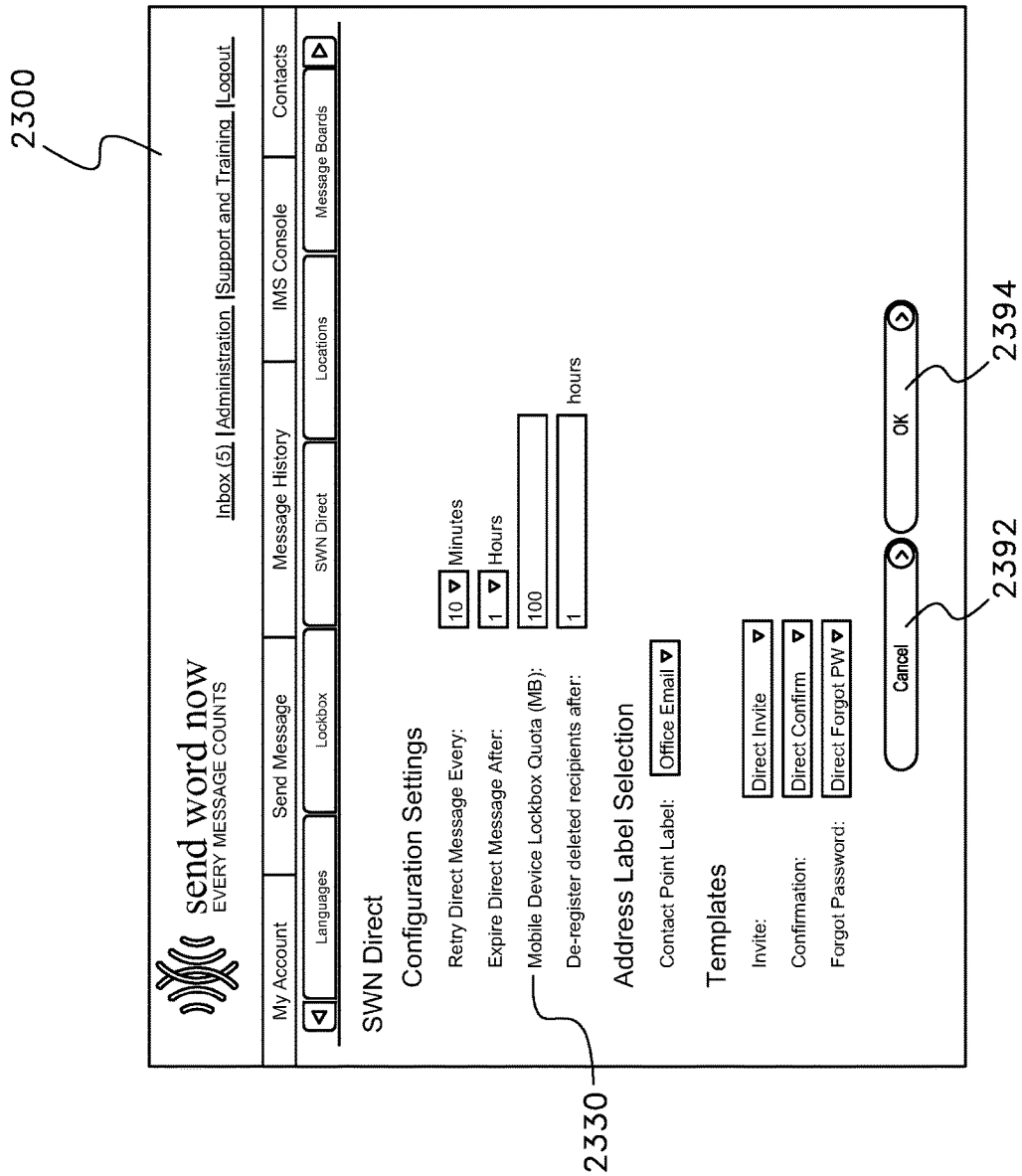
FIG. 23 depicts configuration settings interface according to one embodiment of the disclosed invention.

FIG. 23 depicts a configuration settings interface 2300. The sender may configure setting Mobile Device Lockbox Quota 2330 indicating to limit the mobile device lockbox quota to, for example, 100 MB. This setting places a limit on the amount of recipient mobile device memory that may be used to store lockbox files. The sender may save the configuration by selecting ok option 2394, or proceed without saving the configuration changes by selecting cancel option 2392. The lockbox quota may be input at the first computing device, wherein the lockbox quota limits the size of the lockbox contents on the at least one recipient computing device. This is a customer control meant to limit the total size of all lockbox files that a customer sends their employees to not consume all available persistent storage on a mobile device.

The present invention provides a transparent method for secure file transmission from a first computing device of a sender to a second computing device of at least one recipient, the method comprising the steps of: selecting a group (for example in group selection box 340 of FIG. 3), at least one recipient (see interface 400 which further illustrates recipient name 480, unique id 490, and selection box 470 that can be checked to select the listed recipients) and a file from the first computing device (see, for example, FIG. 5 in which a filename 530 may appear in the alert links window along with the file upload status 540). Each of the at least one recipients has a recipient computing device (see, for example, FIG. 9 showing a recipient computing device as an Iphone®) to provide at least one recipient computing device and wherein each of the at least one recipients is a member of the group and wherein the file is to be transmitted from the first computing device to at least one recipient computing device; selecting a lockbox option at the first computing device to securely transmit the file to a lockbox situated at the at least one recipient computing device (or a backend database in communication with the at least one recipient computing device, which is an equivalent herein) to provide lockbox contents of at least one file (see FIG. 6, where selecting the lockbox option 610 causes display of interface 700 illustrated in FIG. 7. According to one embodiment, the lockbox option 610 appears as a lock icon). The method next iteratively selects a location on at least one recipient computing device where the file is to be dispatched by performing a set of lockbox content version control operations at the first computing device until a valid location on the at least one recipient computing device is selected. The file is dispatched at the valid location and the step of presenting an indication at each of the at least one recipient computing devices that the file is dispatched with the lockbox option is performed. The next step may be displaying the file in response to at least one recipient selecting a view lockbox content option at the at least one recipient computing device.

The set of lockbox content version control operations may further comprise the steps of: determining whether a duplicate file exists at the location on each of the at least one recipient computing device(s) such that the name of the file that the sender at the first computing device is intending to dispatch is identical to the name of the file already present at the location on the at least one recipient computing device. This is described above with reference to FIG. 8. The set of lockbox content version control operations may comprise prompting the sender at the first computing device to select a second location on the at least one recipient computing device if the duplicate file exists at the location on the at least one recipient computing device. There may also be the step of prompting the sender at the first computing device to overwrite the duplicate file on the at least one recipient computing device if the second location is not selected. There may be the step of prompting the sender at the first computing device to abort the file dispatch to the at least one recipient computing device if the overwrite option is not selected. There may also be the step of maintaining an audit trail by tracking operations performed on the file and updating a file database to reflect the audit trail. There may be the step of presenting a log of tracked operations on the first computing device in response to the sender presenting a query to the file database. Also, any information transmitted according to the present invention may be stored on a backend database. There may be the step of continuously synchronizing the lockbox contents to reflect operations performed on the lockbox (in this situation all versions are maintained on the user device and the backend database). There may be the steps of encrypting and protecting lockbox contents by user credentials. There may also be the step of making available lockbox contents when the at least one recipient computing device is off-net. The term "off-net" is intended to refer to the situation when a user does not have Wi-Fi, internet or phone connectivity. A user may also be "off-net" if the computer app is not installed on their device. This may occur, for example, if the user gets a new device and has not yet installed the app. There may be the step of updating a message dispatch status on the first computing device after transmitting the file to the location.

Another aspect of the present invention provides a transparent file transmission system establishing a secure communication link from a first computing device of a sender to at least one recipient computing device of at least one recipient, the system configured to perform the following operations: select a group, at least one recipient and a file from the first computing device, wherein each of the at least one recipients has a recipient computing device to provide at least one recipient computing device, wherein each of the at least one recipients is a member of the group and wherein the file is to be transmitted from the first computing device to the at least one recipient computing device. The system may be further configured to select a lockbox option at the first computing device to securely transmit the file to a lockbox situated at the at least one recipient computing device to provide lockbox contents of at least one file; iteratively select a location on the at least one recipient computing device by performing a set of lockbox content version control operations at the first computing device until a valid location is selected, wherein the location is situated on the at least one recipient computing device where the file is to be dispatched; dispatch the file at the valid location at the at least one recipient computing device and presenting an indication at each of the at least one recipient computing devices that the file is dispatched with the lockbox option; and display the file in response to the recipient selecting a view lockbox content option at the at least one recipient computing device.

The set of lockbox content version control operations may be configured to determine whether a duplicate file exists at the location on the at least one recipient computing device such that the name of the file the sender is intending to dispatch is identical to the name of the file already present at the location on the at least one recipient computing device. The set of lockbox content version control operations may also be configured to prompt the sender to select a second location on the at least one recipient computing device if the duplicate file exists at the location on the at least one recipient computing device. The system may be further configured to prompt the sender to overwrite the duplicate file on the at least one recipient computing device if the second location is not selected. The system may be further configured to prompt the sender to abort the file dispatch to the at least one recipient computing device if the overwrite option is not selected. The system may be further configured to maintain an audit trail by tracking operations performed on the file and updating a file database to reflect the audit trail. The system may also be further configured to present a log of tracked operations on the first computing device in response to the sender presenting a query to the file database, to continuously synchronize lockbox contents to reflect operations performed on the lockbox contents, to encrypt and protect lockbox contents by user credentials, and to make available lockbox contents when the at least one recipient computing device is off-net.

The invention claimed is:

1. A transparent method for secure file transmission from a first computing device of a sender to a second computing device of at least one recipient, the method comprising the steps of:

selecting a group comprising a set of recipients and a file from the first computing device, wherein each recipient from the set of recipients has at least one recipient computing device and wherein the file is to be transmitted from the first computing device to at least one recipient computing device;

selecting a lockbox option at the first computing device to securely transmit the file to a lockbox situated at the at least one recipient computing device;

iteratively selecting a destination location on the at least one recipient computing device where the file is to be dispatched by performing a set of lockbox content version control operations at the first computing device until a valid location on the at least one recipient computing device is selected, wherein the set of lockbox content version control operations comprises determining whether a duplicate file exists at the destination location on each of the at least one recipient computing device, such that the name of the file that the sender at the first computing device is intending to dispatch is identical to the name of the file already present at the destination location on the at least one recipient computing device by performing the following operations: prompting the sender at the first computing device to select a second location on the at least one recipient computing device if the duplicate file exists at the destination location on the at least one recipient computing device, designating the valid location to null, designating the second location as the valid location if the duplicate file does not exist at the second location, and iteratively prompting the sender to select the subsequent location, and designating the subsequent location as the valid location if the duplicate file does not exist at the subsequent location until the valid location or until the sender aborts the file dispatch;

dispatching the file at the valid location and presenting an indication at the at least one recipient computing device that the file is dispatched with the lockbox option; and displaying the file in response to at least one recipient selecting a view lockbox content option at the at least one recipient computing device.

2. The method of claim 1, further comprising the steps of:
prompting the sender at the first computing device to overwrite the duplicate file at the destination location on the at least one recipient computing device if the second location is not selected; and designating the destination location as the valid location if the sender selects to overwrite the duplicate file at the destination location.

3. The method of claim 2, further comprising the steps of prompting the sender at the first computing device to abort the file dispatch to the at least one recipient computing device if the overwrite option is not selected and designating the valid location as null.

4. The method of claim 1, further comprising the step of maintaining an audit trail by tracking operations performed on the file and updating a file database to reflect the audit trail.

5. The method of claim 1, further comprising the step of presenting a log of tracked operations on the first computing device in response to the sender presenting a query to the file database.

6. The method of claim 1, further comprising the step of continuously synchronizing lockbox contents to reflect operations performed on the lockbox contents.

7. The method of claim 1, further comprising the steps of encrypting and protecting lockbox contents by user credentials.

8. The method of claim 1, further comprising the step of making available lockbox contents when the at least one recipient computing device is off-net.

9. The method of claim 1, further comprising the step of updating a message dispatch status on the first computing device after transmitting the file to the destination location.

10. The method of claim 1, further comprising the step of selecting a lockbox quota at the first computing device, wherein the lockbox quota limits the size of the lockbox contents on the at least one recipient computing device.

11. A transparent file transmission system establishing a secure communication link from a first computing device of a sender to at least one recipient computing device of at least one recipient, the system comprising:

a hardware processor configured to perform the following operations:

display a selection interface to select a group, recipient comprising a set of recipients and a file from the first computing device, wherein each recipient from the set of recipients has at least one recipient computing device, and wherein the file is to be transmitted from the first computing device to the at least one recipient computing device;

display a lockbox interface to select a lockbox option at the first computing device to securely transmit the file to a lockbox situated at the at least one recipient computing device to provide lockbox contents of at least one file;

display a version control interface to iteratively select a destination location on the at least one recipient computing device by performing a set of lockbox content version control operations at the first computing device until a valid location is selected, wherein the destination location is situated on the at least one recipient computing device where the file is to be dispatched, wherein the set of lockbox content version control operations are configured to:

determine whether a duplicate file exists at the destination location on the at least one recipient computing device, such that the name of the file the sender is intending to dispatch is identical to the name of the file already present at the destination location on the at least one recipient computing device, and prompt the sender to select a second location on the at least one recipient computing device if the duplicate file exists at the destination location on the at least one recipient computing device;

display a dispatch notification interface to present an indication at each of the at least one recipient computing device that the file is dispatched with the lockbox option after dispatching the file at the valid location at the at least one recipient computing device; and display a lockbox content interface to display the file in response to the recipient selecting a view lockbox content option at the at least one recipient computing device.

12. The system of claim 11, further configured to prompt the sender to overwrite the duplicate file on the at least one recipient computing device if the second location is not selected.

13. The system of claim 11, further configured to prompt the sender to abort the file dispatch to the at least one recipient computing device if the overwrite option is not selected.

14. The system of claim 11, further configured to maintain an audit trail by tracking operations performed on the file and updating a file database to reflect the audit trail.

15. The system of claim 11, further configured to present a log of tracked operations on the first computing device in response to the sender presenting a query to the file database.

16. The system of claim 11, further configured to continuously synchronize lockbox contents to reflect operations performed on the lockbox contents.

17. The system of claim 11, further configured to encrypt and protect lockbox contents by user credentials.

18. The system of claim 11, further configured to make available lockbox contents when the at least one recipient computing device is off-net.

19. The system of claim 11, further comprising a lockbox quota input at the first computing device, wherein the lockbox quota limits the size of the lockbox contents on the at least one recipient computing device.

20. A transparent method for secure file transmission from a first computing device of a sender to a second computing device of at least one recipient, the method comprising the steps of:
- selecting a group, at least one recipient and a file from the first computing device, wherein the at least one recipients has a set of recipient computing device and the at least one recipients is a member of the group, and wherein the file is to be transmitted from the first computing device to the at least one recipient computing device;
- selecting a specific computing device from the set of recipient computing device; selecting a mode of communication for the specific computing device; selecting a lockbox option at the first computing device to securely transmit the file to a lockbox situated at the specific computing device;
- iteratively selecting a destination location where the file is to be dispatched on the specific computing device by performing a set of lockbox content version control operations at the first computing device until a valid location on the specific computing device is selected, wherein the set of lockbox content version control operations comprises determining whether a duplicate file exists at the destination location on each of the at least one recipient computing device, such that the name of the file that the sender at the first computing device is intending to dispatch is identical to the name of the file already present at the destination location on the at least one recipient computing device by performing the following operations:
- prompting the sender at the first computing device to select a second location on the at least one recipient computing device if the duplicate file exists at the destination location on the at least one recipient computing device,
- designating the valid location to null,
- designating the second location as the valid location if the duplicate file does not exist at the second location, and
- iteratively prompting the sender to select the subsequent location, and designating the subsequent location as the valid location if the duplicate file does not exist at the subsequent location until the valid location or until the sender aborts the file dispatch;
- dispatching the file at the valid location via the selected mode of communication and presenting an indication at the specific computing device that the file is dispatched with the lockbox option; and
- displaying the file in response to at least one recipient selecting a view lockbox content option at the at least one recipient computing device.

* * * * *